US009807294B2

(12) United States Patent
Liu et al.

(10) Patent No.: US 9,807,294 B2
(45) Date of Patent: Oct. 31, 2017

(54) IMAGE SENSOR WITH SYMMETRIC MULTI-PIXEL PHASE-DIFFERENCE DETECTORS, AND ASSOCIATED METHODS

(71) Applicant: OmniVision Technologies, Inc., Santa Clara, CA (US)

(72) Inventors: Guansong Liu, San Jose, CA (US);
Jizhang Shan, Los Gatos, CA (US);
Chin Poh Pang, Pleasanton, CA (US);
Xiaodong Yang, Santa Clara, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 153 days.

(21) Appl. No.: 14/819,021

(22) Filed: Aug. 5, 2015

(65) Prior Publication Data

US 2017/0041525 A1 Feb. 9, 2017

(51) Int. Cl.
| | |
|---|---|
| *H04N 5/232* | (2006.01) |
| *G03B 13/36* | (2006.01) |
| *G02B 7/36* | (2006.01) |
| *G02B 5/20* | (2006.01) |
| *H04N 9/04* | (2006.01) |

(52) U.S. Cl.
CPC ......... *H04N 5/23212* (2013.01); *G02B 5/201* (2013.01); *G02B 7/36* (2013.01); *G03B 13/36* (2013.01); *H04N 9/045* (2013.01)

(58) Field of Classification Search
CPC ........... H04N 5/23212; H04N 5/23216; G02B 5/201; G02B 7/36; G03B 13/36
See application file for complete search history.

(56) References Cited

U.S. PATENT DOCUMENTS

| | | | |
|---|---|---|---|
| 2007/0014019 A1 | 1/2007 | Mouli | |
| 2009/0109322 A1* | 4/2009 | Ohnishi | G03B 13/16 348/345 |
| 2012/0154637 A1* | 6/2012 | Hara | H04N 5/23212 348/239 |
| 2013/0038691 A1 | 2/2013 | Agranov et al. | |
| 2015/0076643 A1 | 3/2015 | Kikuchi | |

OTHER PUBLICATIONS

Taiwan Application No. 105122790; English Translation of the First Office Action dated Apr. 12, 2017; 5 pages.

* cited by examiner

*Primary Examiner* — Mekonnen Dagnew
(74) *Attorney, Agent, or Firm* — Lathrop Gage LLP

(57) ABSTRACT

An imaging system with on-chip phase-detection includes an image sensor with symmetric multi-pixel phase-difference detectors. Each symmetric multi-pixel phase-difference detector includes (a) a plurality of pixels forming an array and each having a respective color filter thereon, each color filter having a transmission spectrum and (b) a microlens at least partially above each of the plurality of pixels and having an optical axis intersecting the array. The array, by virtue of each transmission spectrum, has reflection symmetry with respect to both (a) a first plane that includes the optical axis and (b) a second plane that is orthogonal to the first plane. The imaging system includes a phase-detection row pair, which includes a plurality of symmetric multi-pixel phase-difference detectors in a pair of adjacent pixel rows and a pair, and an analogous phase-detection column pair.

16 Claims, 16 Drawing Sheets

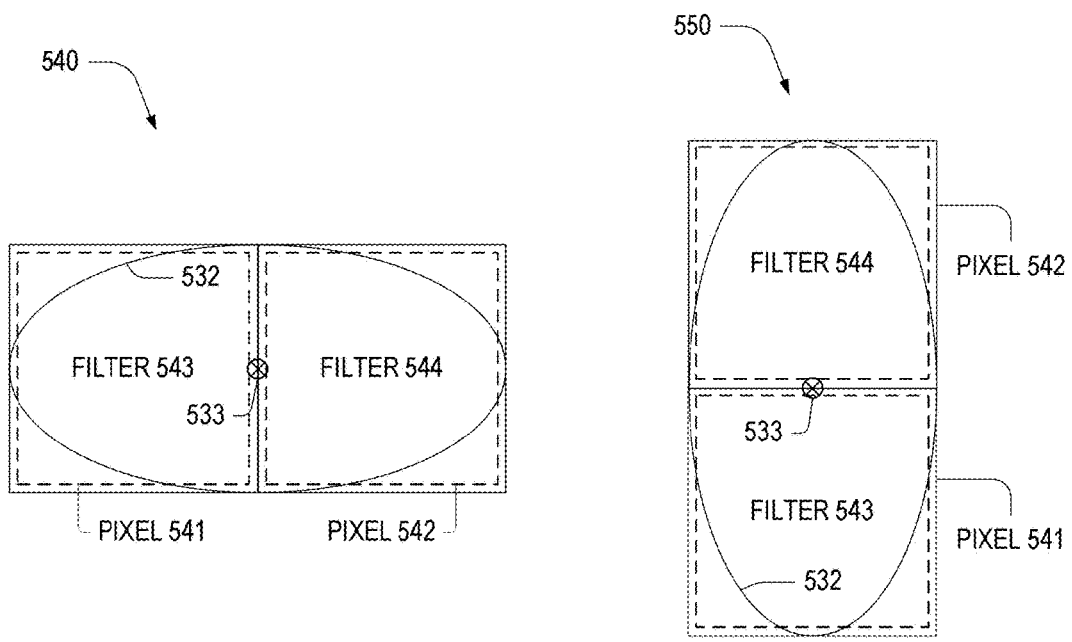
FIG. 5A
FIG. 5B
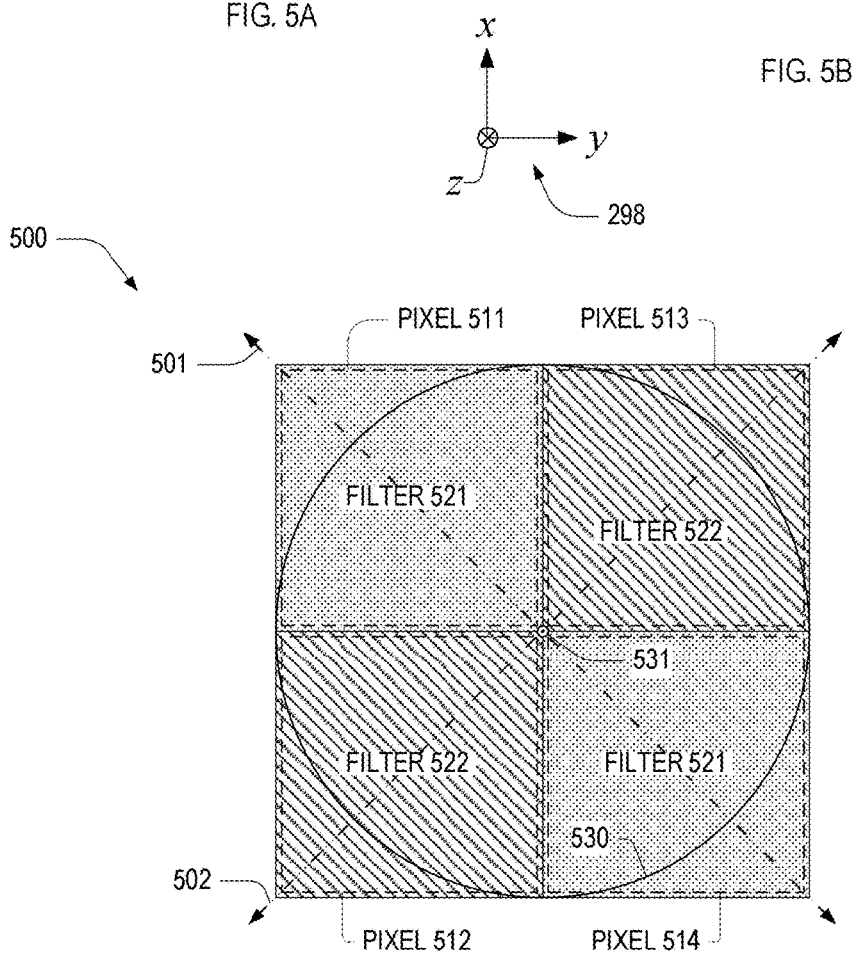
FIG. 5C

IMAGE SENSOR WITH SYMMETRIC MULTI-PIXEL PHASE-DIFFERENCE DETECTORS, AND ASSOCIATED METHODS

BACKGROUND

The vast majority of electronic cameras have autofocus capability. The autofocus function automatically focuses the camera on objects in the scene viewed by the camera. Autofocus may be fully automatic such that the camera identifies objects in the scene and focuses on the objects. In some cases, the camera may even decide which objects are more important than other objects and subsequently focus on the more important objects. Alternatively, autofocus may utilize user input specifying which portion or portions of the scene are of interest. Based thereupon, the autofocus function identifies objects within the portion or portions of the scene, specified by the user, and focuses the camera on such objects.

To achieve market adoption, the autofocus function must be reliable and fast such that every time a user captures an image, the camera quickly brings the desired portion, or portions, of the scene into focus. Preferably, the autofocus function is sufficiently fast that the user does not notice any delay between pressing the trigger button and image capture. The autofocus is particularly important for cameras having no means for manual focus, such as compact digital cameras and camera phones.

Many electronic cameras use contrast autofocus, wherein the autofocus function adjusts the imaging objective to maximize contrast in at least a portion of the scene, thus bringing the portion of the scene into focus. More recently, phase-detection autofocus has gained popularity because it is faster than contrast autofocus. Phase-detection autofocus directly measures the degree of misfocus by comparing light passing through one portion of the imaging objective, e.g., the left portion, with light passing through another portion of the imaging objective, e.g., the right portion. Some digital single-lens reflex cameras include a dedicated phase-detection sensor in addition to the image sensor that captures images.

However, this solution is not feasible for more compact and/or less expensive cameras. Therefore, camera manufacturers are developing image sensors with on-chip phase detection, i.e., image sensors with integrated phase detection capability. A variety of pixel layouts have been proposed for this purpose. These include pixel layouts that include phase-detection pixels that have an opaque mask (or equivalently a shield) that blocks light from reaching one side of the pixel. Such partially-masked (partially-shielded) pixels enable distinguishing light passing through the imaging objective from different directions. Drawbacks of this approach are that the light-blocking masks decrease pixel sensitivity in low-light conditions, shadow neighboring pixels, and reflect light that results in cross-talk in neighboring pixels.

SUMMARY OF THE INVENTION

The embodiments disclosed herein demonstrate on-chip phase detection without the use of a light-blocking mask in phase-detection pixels. This absence of a light-blocking mask, e.g., between a pixel's microlens and photosensitive region, results in several advantages over prior-art phase-detection pixels that include a light-blocking mask. These include better light sensitivity and, with respect to neighboring pixels, reduced shadowing and reduced cross-talk.

An image sensor with symmetric multi-pixel phase-difference detectors is disclosed. Each symmetric multi-pixel phase-difference detector includes (a) a plurality of pixels forming an array and each having a respective color filter thereon, each color filter having a transmission spectrum and (b) a microlens at least partially above each of the plurality of pixels and having an optical axis intersecting the array. The array, by virtue of each transmission spectrum, has reflection symmetry with respect to at least one of (a) a first plane that includes the optical axis and (b) a second plane that is orthogonal to the first plane.

An imaging system with on-chip phase-detection is also disclosed. The imaging system includes a phase-detection row pair, a phase-detection column pair, and a phase-processing module. The phase-detection row pair is capable of measuring a pair of horizontal line profiles for light incident from left and right directions and includes a plurality of symmetric multi-pixel phase-difference detectors in a pair of adjacent pixel rows. The phase-detection column pair is capable of measuring a pair of vertical line profiles for light incident from top and bottom directions and includes a plurality of symmetric multi-pixel phase-difference detectors in a pair of adjacent pixel columns. The phase-processing module is capable of processing the at least one pair of horizontal line profiles and the at least one pair of vertical line profiles to measure phase shift associated with an arbitrarily-oriented and arbitrarily-located edge in the scene.

A method for phase detection using an image sensor with symmetric multi-pixel phase-difference detectors is disclosed. The method includes generating a first line profile and a second line profile, and determining a first phase shift from a spatial separation between the first line profile and the second line profile. The first line profile is generated from an object edge imaged on a first pixel subset in each of a plurality of mutually collinear symmetric multi-pixel phase-difference detectors of the image sensor. The second line profile is generated from the object edge imaged on a second pixel subset in each of the plurality of mutually collinear symmetric multi-pixel phase-difference detectors.

BRIEF DESCRIPTION OF THE FIGURES

FIGS. 5A, 5B, and 5C each show a plan view of an exemplary symmetric multi-pixel phase-difference-detector of the image sensor of FIG. 1, in an embodiment.

DETAILED DESCRIPTION

Figure 1:
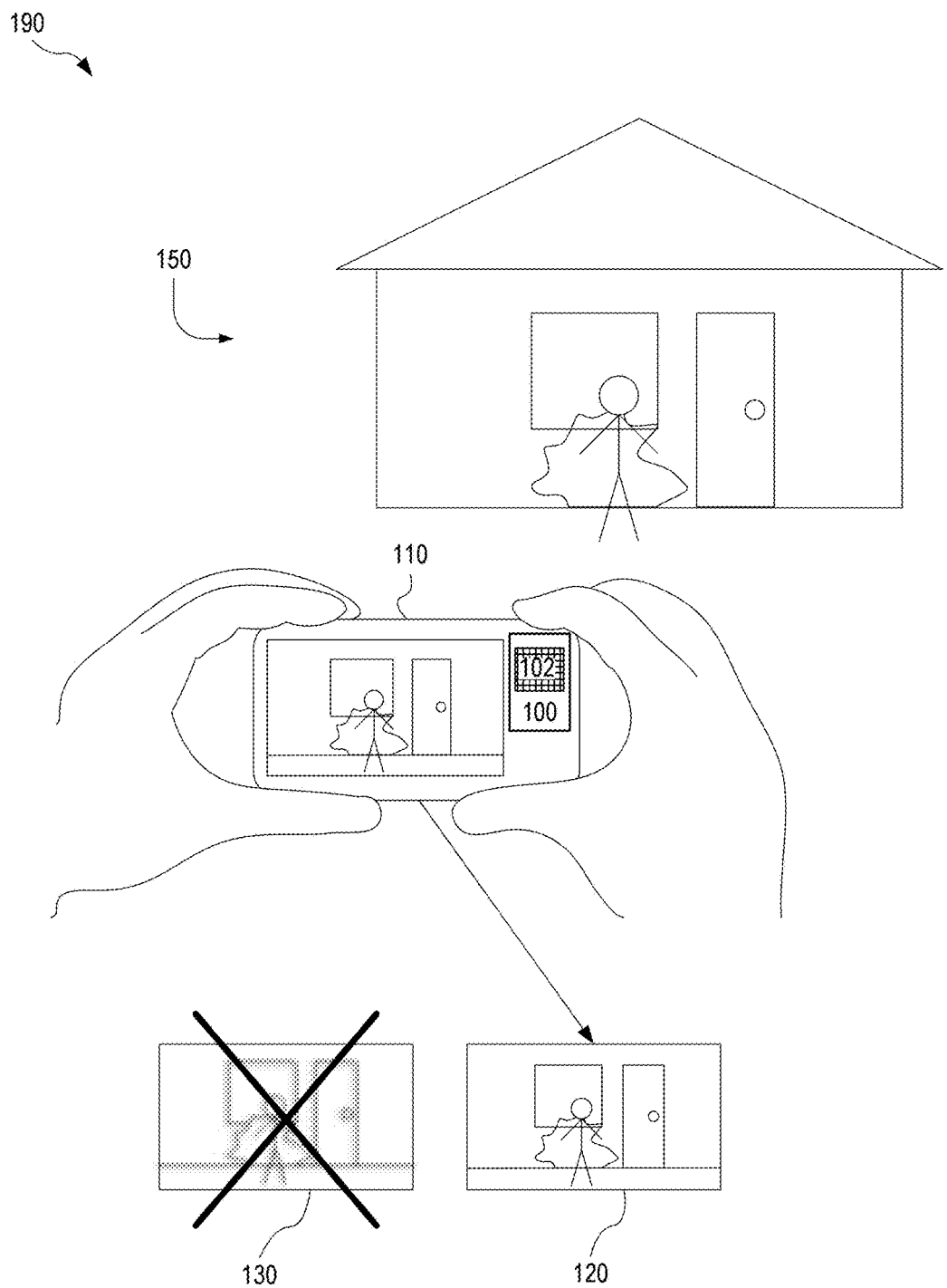
FIG. 1 illustrates an image sensor with symmetric multi-pixel phase-difference detectors in a use scenario, according to an embodiment.

FIG. 1 illustrates one exemplary image sensor 100, with symmetric multi-pixel phase-difference detectors, in an exemplary use scenario 190. Image sensor 100 is implemented in an electronic camera 110 for imaging of a scene 150. Electronic camera 110 is, for example, a camera phone or a compact digital camera. Electronic camera 110 utilizes the on-chip phase detection capability of image sensor 100 to focus on scene 150. When focused, electronic camera 110 utilizes image sensor 100 to capture a focused image 120, instead of a defocused image 130, of scene 150.

Image sensor 100 is configured to provide on-chip symmetric multi-pixel phase-difference detection capable of detecting edges, within scene 150, of arbitrary orientation and location. Image sensor 100 thereby enables robust autofocus for electronic camera 110. For example, through use of image sensor 100, electronic camera 110 is able to reliably autofocus on sparsely populated scenes 150. Image sensor 100 also enables a very flexible autofocus function, which may be utilized by electronic camera 110 to autofocus on objects of arbitrary location within scene 150, and/or on an arbitrary selection of portions of scene 150 that are associated with one or more edges. Herein, an "edge" in a scene refers to a spatial difference such as spatial brightness difference or a spatial color difference.

In an embodiment, image sensor 100 is a complementary metal-oxide-semiconductor (CMOS) image sensor. Image sensor 100 may be a color image sensor or a monochrome image sensor. Image sensor 100 includes a pixel array 102 that may include color filters arranged in a color filter array, such as a Bayer pattern or others known in the art.

FIGS. 2A, 2B, 3A, 3B, 4A, and 4B, discussed below, illustrate how on-chip phase detection of image sensor 100 (FIG. 1) may be used to determine the degree of misfocus of one exemplary imaging system composed of image sensor 100 and an imaging objective 210.

Figure 2A:
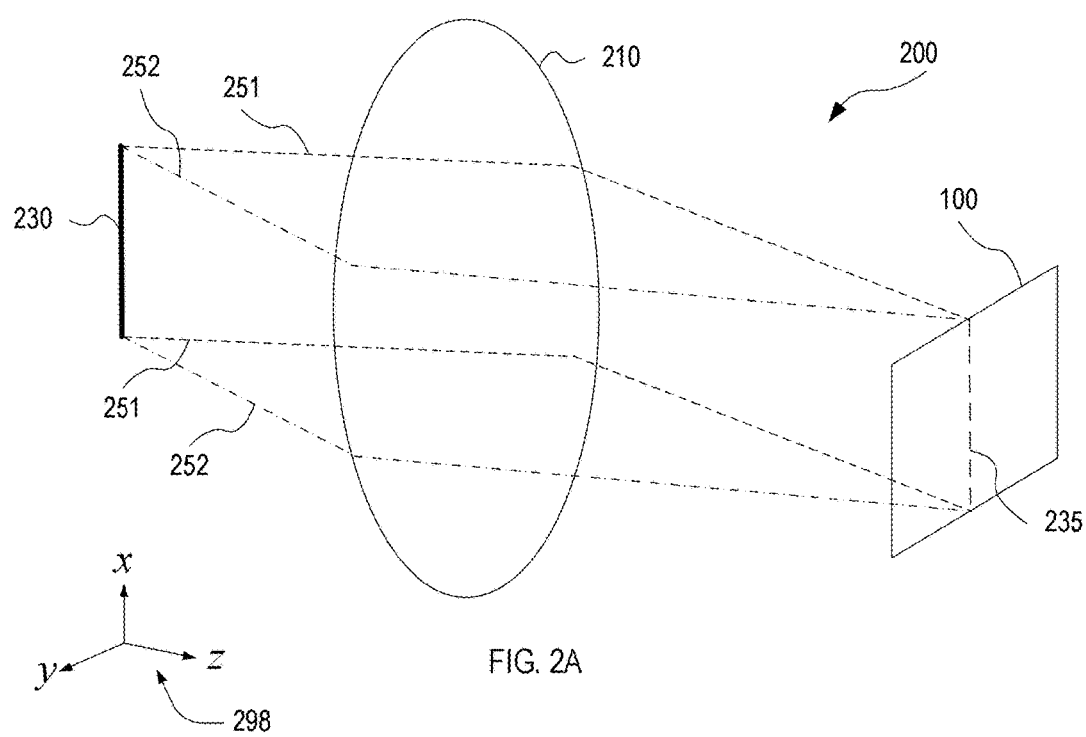
FIGS. 2A and 2B depict an in-focus imaging scenario of an object by an imaging objective onto the image sensor of FIG. 1, in an embodiment.
Figure 2B:
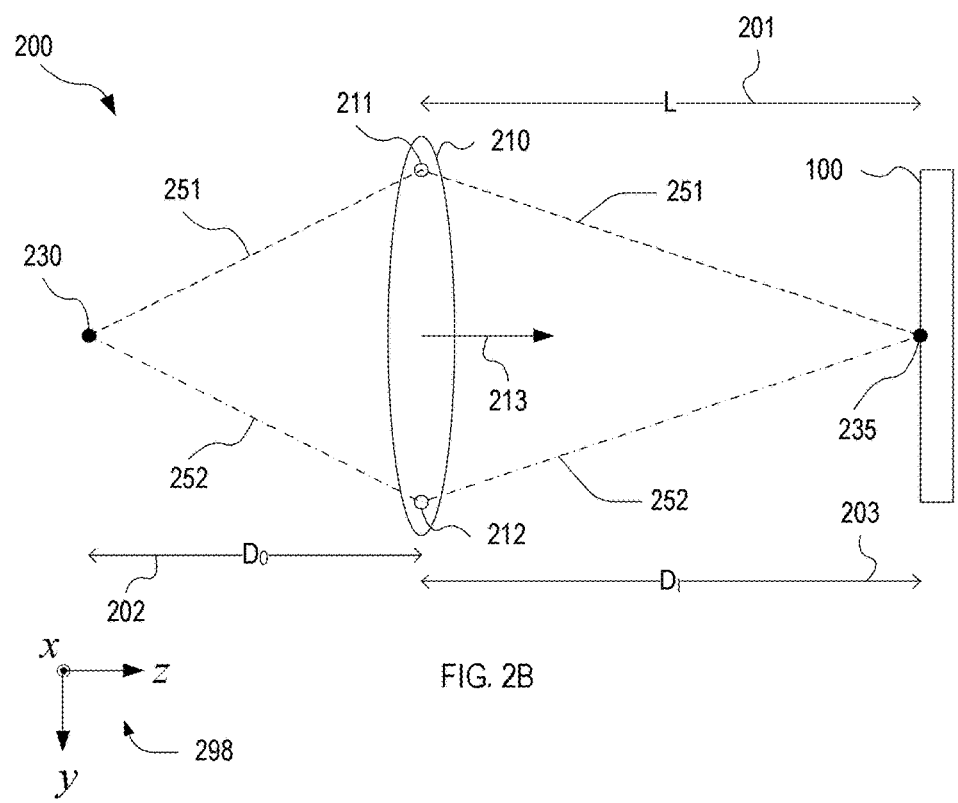

FIGS. 2A and 2B show an imaging scenario 200 that illustrates imaging of an object edge 230 by imaging objective 210 onto image sensor 100, when object edge 230 is in focus of the imaging system. Object edge 230 may be a physical edge or a boundary between two differently-colored regions of an object, such as adjacent stripes or text on a background. FIG. 2A shows imaging scenario 200 in perspective view, while FIG. 2B shows imaging scenario 200 in cross-sectional view. FIGS. 2A and 2B are best viewed together. With respect to coordinate system 298, object edge 230 is parallel to the x-axis, imaging objective 210 has an optical axis 213 parallel to the z-axis, and image sensor 100 is parallel to the x-y plane.

Exemplary portions 211 and 212 of an imaging objective 210 are located on opposite sides of and are equidistant from optical axis 213. Portions 211 and 212 define two rays, or ray bundles, 251 and 252 propagating from an object edge 230 towards an image sensor 100. Rays 251 propagate from object edge 230 to image sensor 100 through portion 211 of imaging objective 210. Similarly, rays 252 propagate from object edge 230 to image sensor 100 through portion 212 of imaging objective 210. While FIGS. 2A and 2B illustrate object edge 230 as being located on optical axis 213, object edge 230 may be located away from optical axis 213, without departing from the scope hereof.

Imaging objective 210 has a focal length f. Assuming that imaging objective 210 is a thin lens, the thin lens equation dictates that $$\frac{1}{f} = \frac{1}{D_O} + \frac{1}{D_I},$$ (EQ. 1)

where $D_O$ is the distance 202 from an object to imaging objective 210 and $D_I$ is the distance 203 from imaging objective 210 to a focused image of the object. In imaging scenario 200, imaging objective 210 is at a distance 201, denoted by L, from image sensor 100, where $L=D_I$. Therefore, object edge 230 is in focus of the imaging system formed by imaging objective 210 and image sensor 100, and the images formed on image sensor 100 by portions 211 and 212 coincide to yield a single image 235.

Figure 3A:
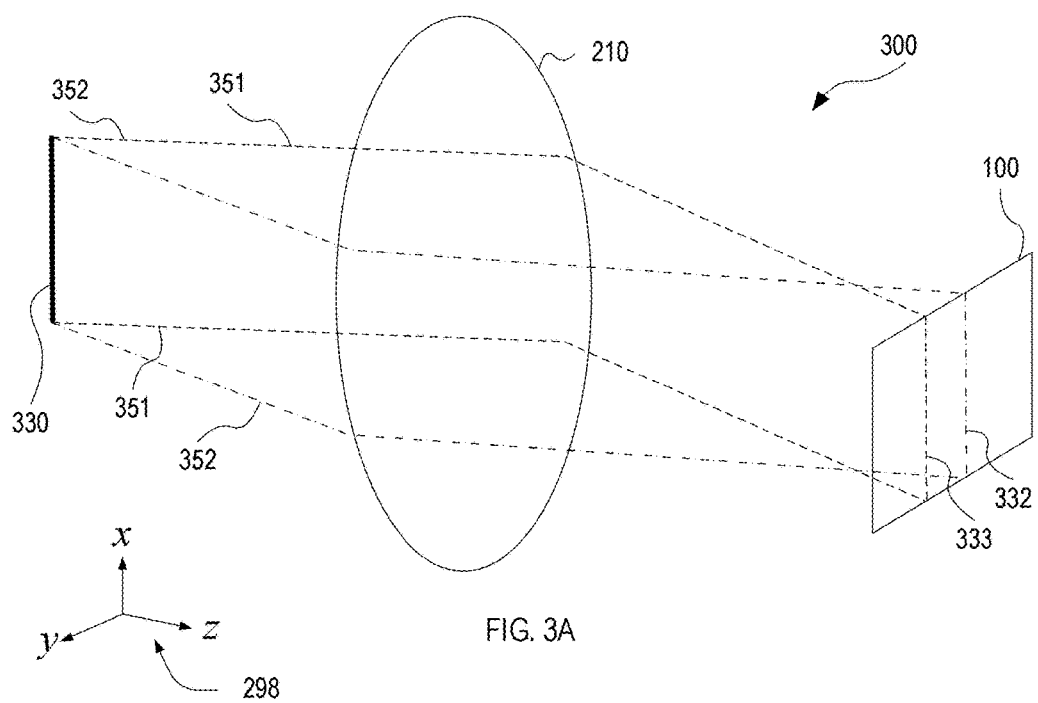
FIGS. 3A and 3B depict a first misfocused imaging scenario of an object by an imaging objective onto the image sensor of FIG. 1, in an embodiment.
Figure 3B:
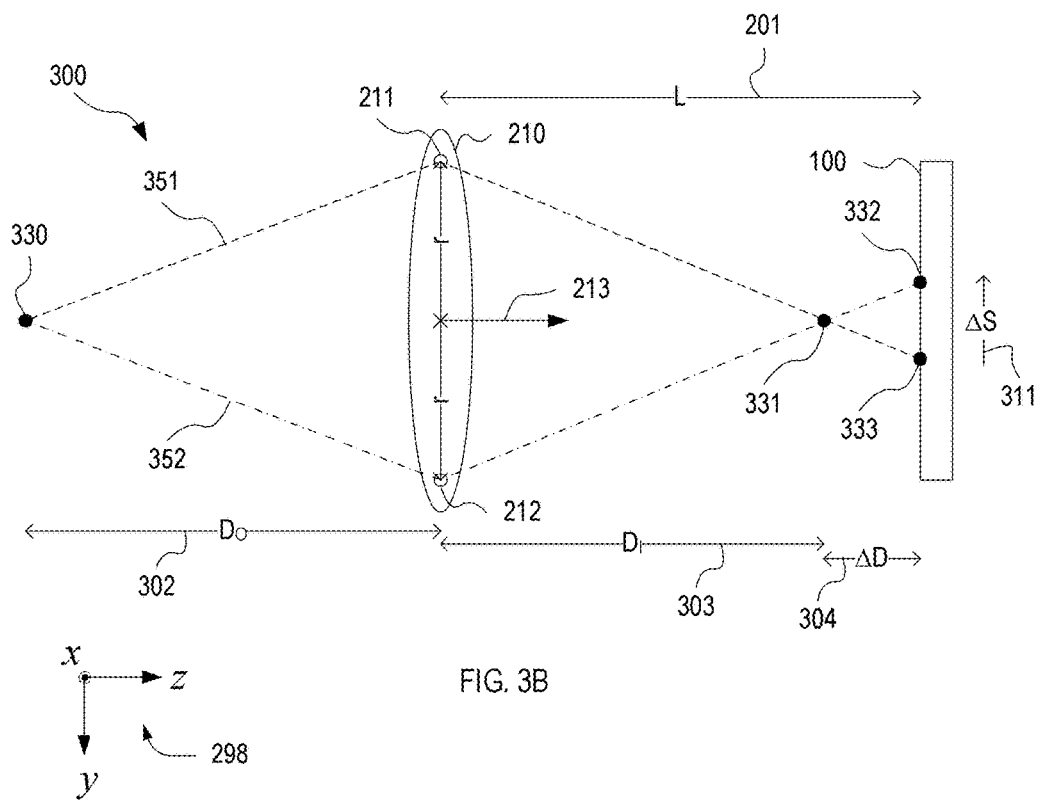

FIGS. 3A and 3B show an imaging scenario 300 that illustrates imaging of an object edge 330 by the imaging system of FIGS. 2A and 2B, where object edge 330 is more distant than being in focus of the imaging system. Object edge 330 is similar to object edge 230. FIG. 3A shows imaging scenario 300 in perspective view, while FIG. 3B shows imaging scenario 300 in cross-sectional view. FIGS. 3A and 3B are best viewed together. With respect to coordinate system 298, object edge 330 is parallel to the x-axis.

Object edge 330 is at a distance 302 from imaging objective 210, where distance 302 is greater than distance 202. While FIGS. 3A and 3B illustrate object edge 330 as being located on optical axis 213, object edge 330 may be located away from optical axis 213, without departing from the scope hereof. Rays 351 and 352 propagating from object edge 330 through imaging objective portions 211 and 212 (FIGS. 3A and 3B), respectively, to image sensor 100 (FIGS. 3A and 3B) intersect at a point 331. According to EQ. 1, since distance 302 ($D_O$) is greater than distance 202, distance 303 ($D_I$) is less than distance 203. Hence, point 331 is located between imaging objective 210 and image sensor 100 at a distance 304 (denoted by ΔD) from image sensor 100. Consequently, as illustrated by rays 351 and 352, imaging objective portions 211 and 212 form respective images 332 and 333 on image sensor 100. Images 332 and 333 are apart from each other by a distance 311. Distance 311 corresponds to the misfocus-induced phase shift ΔS between images 332 and 333 and is indicative of the amount of blur in imaging scenario 300.

Figure 4A:
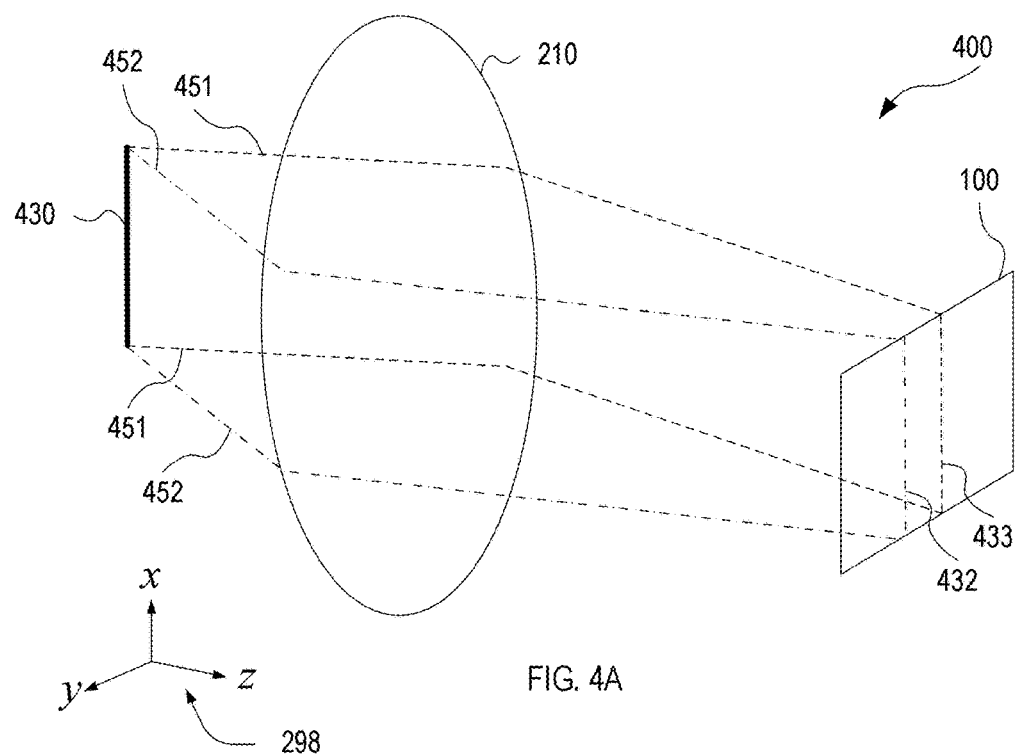
FIGS. 4A and 4B depict a second misfocused imaging scenario of an object by an imaging objective onto the image sensor of FIG. 1, in an embodiment.
Figure 4B:
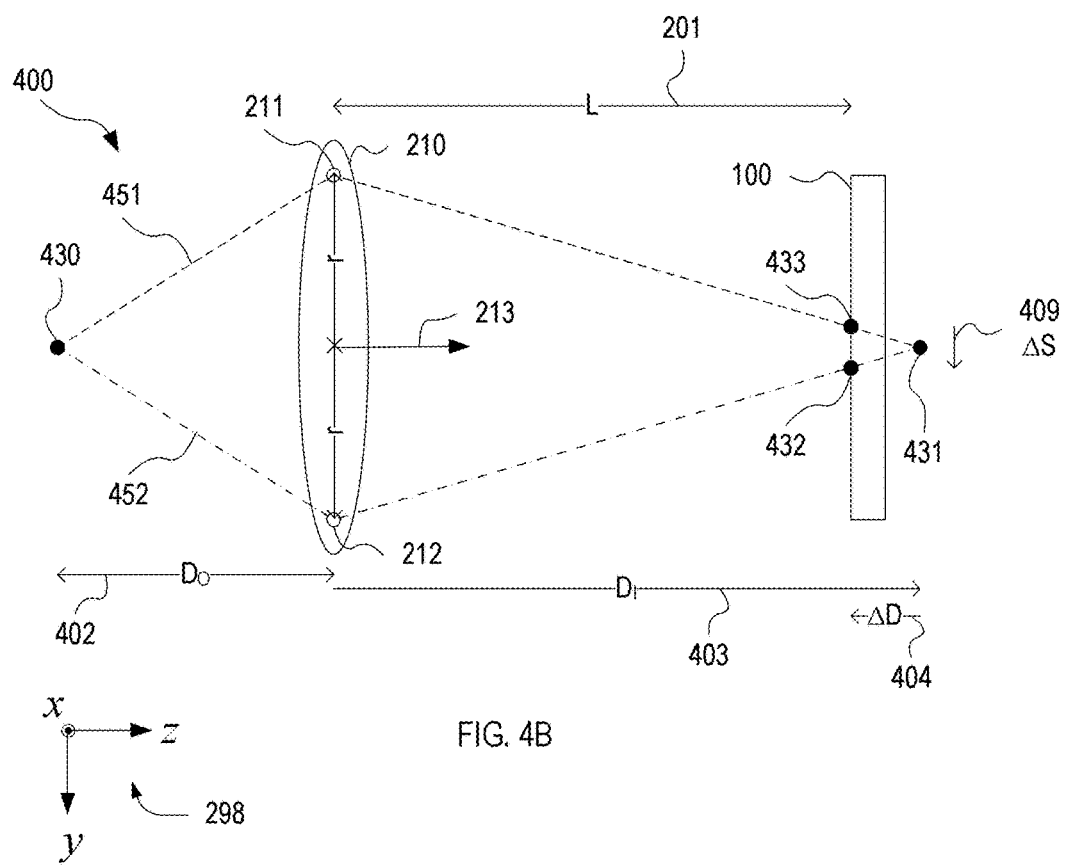

FIGS. 4A and 4B show an imaging scenario 400 that illustrates imaging of an object edge 430 by the imaging system of FIGS. 2A and 2B, where object edge 430 is less distant than being in focus of the imaging system. Object edge 430 is similar to object edge 230. FIG. 4A shows imaging scenario 400 in perspective view, while FIG. 4B shows imaging scenario 400 in cross-sectional view. FIGS. 4A and 4B are best viewed together. With respect to coordinate system 298, object edge 430 is parallel to the x-axis.

Object edge 430 is at a distance 402 from imaging objective 210, where distance 402 is greater than distance 202. While FIGS. 4A and 4B illustrate object edge 430 as being located on optical axis 213, object edge 430 may be located away from optical axis 213, without departing from the scope hereof. Rays 451 and 452 propagate from object edge 430 through imaging objective portions 211 and 212, respectively, to image sensor 100 and intersect at a point 431. According to EQ. 1, since distance 402 ($D_O$) is less than distance 202, distance 403 ($D_I$) is greater than distance 203. Hence, point 431 is located beyond image sensor 100 by a distance 404, denoted by ΔD, from the photosensitive surface of image sensor 100. Consequently, as illustrated by rays 451 and 452, imaging objective portions 211 and 212 form respective images 432 and 433 on image sensor 100. Images 432 and 433 are apart from each other by a distance 409. Distance 409 corresponds to the misfocus-induced phase shift ΔS between images 432 and 433 and is indicative of the amount of blur in imaging scenario 400.

Imaging scenario 200 (FIGS. 2A and 2B), imaging scenario 300 (FIGS. 3A and 3B), and imaging scenario 400 (FIGS. 4A and 4B) illustrate that misfocus, of the imaging system composed of imaging objective 210 and image sensor 100, results in a phase shift between light propagating to image sensor 100 through different portions of imaging objective 210. Image sensor 100 is configured to measure this phase shift. An associated autofocus function may adjust imaging objective 210 to minimize or reduce the phase shift, and thereby focus the imaging system on an object.

While FIGS. 2A, 2B, 3A, 3B, 4A, and 4B show imaging objective 210 as being a thin lens, imaging objective 210 may be a thick lens or a multi-lens objective without departing from the scope hereof.

Image sensor 100 includes at least one symmetric multi-pixel phase-difference detector. FIGS. 5A, 5B, and 5C show plan views of exemplary symmetric multi-pixel phase-difference detectors 540, 550, and 500, respectively. Herein, symmetric multi-pixel phase-difference detectors 540 and 550 are also referred to as horizontal dual-pixel phase-difference detector 540 and vertical dual-pixel phase-difference detector 550, respectively.

Horizontal dual-pixel phase-difference detector 540 includes two horizontally-adjacent phase-detection pixels 541 and 542, color filters 543 and 544, and a microlens 532. Microlens 532 is above phase-detection pixels 541 and 542, which respectively have color filter 543 and 544 thereon. Microlens 532 has an optical axis 533. In an embodiment, pixels 541 and 542 may form a planar array to which optical axis intersects at a 90-degree angle.

As oriented in FIG. 5A, phase-detection pixels 541 and 542 may be denoted as a left-pixel and a right-pixel respectively. Pixels 541 and 542 are referred to as phase-detection pixels because they each lack a dedicated microlens above them; rather, each pixel 541 and 542 is beneath a common microlens 532. For clarity of illustration, the dashed boxes denoting pixels 541 and 542 are smaller than boxes denoting respective color filters 543. Color filters 543 and 544 may have a same transmission spectrum, and may be formed of a single continuous piece of material.

While microlens 532 is shown to have an oval cross-section in the plan view of FIGS. 5A and 5B, it may have a differently-shaped cross-section without departing from the scope hereof. For example, microlens 532 may have a rectangular cross-section in a plane parallel to the x-y plane of coordinate system 298 such that it completely covers both pixels 541 and 542. Microlens 532 may include a portion of a spherical surface, an ellipsoidal surface, or an aspheric surface.

Vertical dual-pixel phase-difference detector 550 is horizontal dual-pixel phase-difference detector 540 rotated by ninety degrees such that it is oriented parallel to the x-axis of coordinate system 298 and phase-detection pixels 541 and 542 are vertically-adjacent. As oriented in FIG. 5B, phase-detection pixels 541 and 542 may be denoted as a bottom-pixel and a top-pixel respectively.

In an embodiment, phase-detection pixels 541 and 542 lack masking elements designed to prevent light from reaching photosensitive regions thereof. That is, phase-detection pixels 541 and 542 have no additional masking elements relative to non-phase-detection pixels of image sensor 100.

Figure 6:
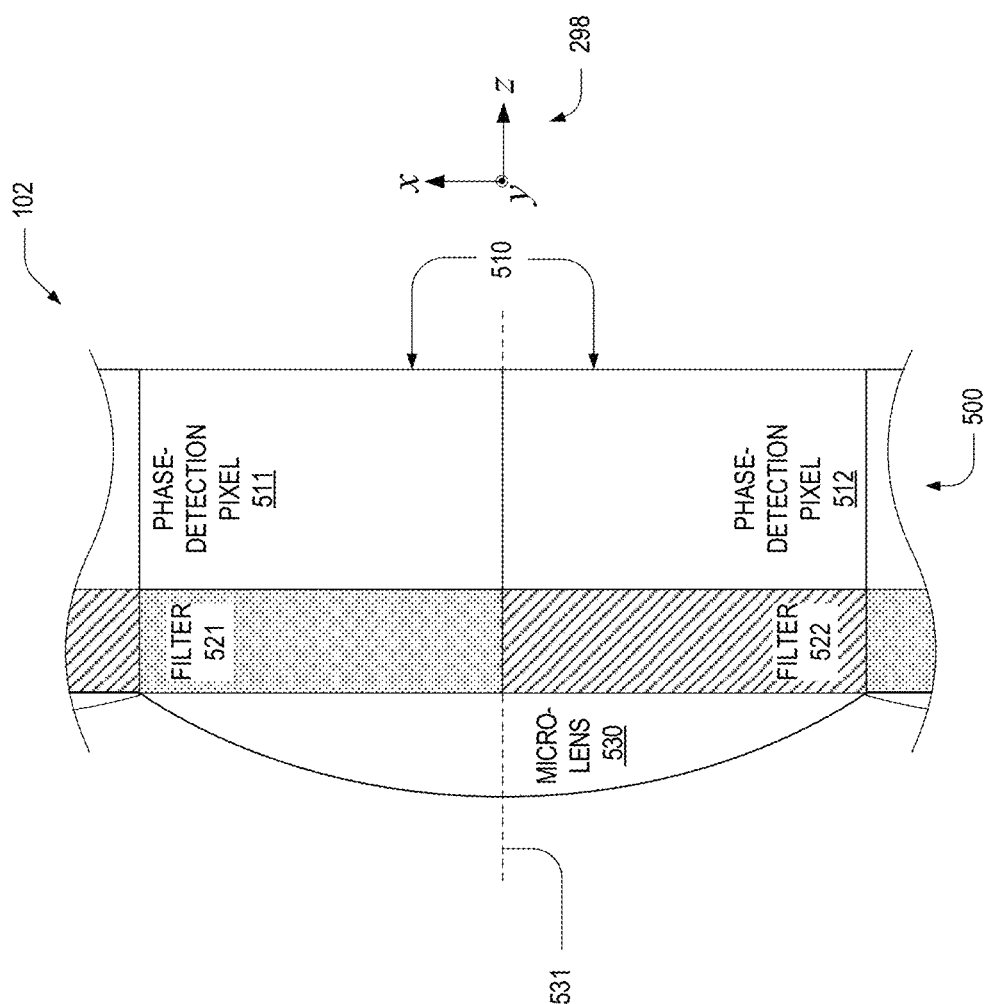
FIG. 6 is a cross-sectional view of the symmetric multi-pixel phase-difference detector of FIG. 5, in an embodiment.

FIG. 5C and FIG. 6 show a plan view and a cross-sectional view, respectively, of one symmetric multi-pixel phase-difference detector 500. FIGS. 5A and 6 are best viewed together in the following description. A microlens 530 is above phase-detection pixels 511, 512, 513, and 514 each having either color filter 521 or 522 thereon. For clarity of illustration, the dashed boxes denoting pixels 511-514 are smaller than boxes denoting respective color filters 521 and 522.

Microlens 530 is positioned above phase-detection pixels 511-514 such that its optical axis 531 is centered therebetween. Pixels 511-514 are referred to as phase-detection pixels because they each lack a dedicated microlens above them; rather, each pixel 511-514 is beneath a common microlens 530.

Color filters 543, 521, and 522 each transmit a specified range or ranges of visible electromagnetic radiation to its associated underlying pixel. For example, visible color filters based on primary colors have pass bands corresponding to the red, green, or blue (RGB) region of the electromagnetic spectrum, and are referred to as red filters, green filters, and blue filters respectively. Visible color filters based on secondary colors have pass bands corresponding to combinations of primary colors, resulting in filters that transmit either cyan, magenta, or yellow (CMY) light, and are referred to as cyan filters, magenta filters, and yellow filters, respectively. A panchromatic color filter (Cl) transmits all colors of visible light equally. Since the transmission spectrum of a pixel's color filter distinguishes it from its neighboring pixels, a pixel is referred to by its filter type, for example, a "red pixel" includes a red filter. Herein, the transmission of a pixel refers to the transmission spectrum of its color filter.

Symmetry planes 501 and 502 may be perpendicular to each other, contain optical axis 531, and intersect each other at optical axis 531. Phase-detector pixels 511-514 may have a common back-plane 510 such that they form a planar array. Optical axis 531 may intersect back-plane 510 at a 90-degree angle such that optical axis 531 is perpendicular to pixel array 102. Symmetric multi-pixel phase-difference detectors 500 have reflection symmetry with respect to both symmetry planes 501 and 502. Symmetric multi-pixel phase-difference detector 500 also has two-fold rotational symmetry. Table 1 shows fourteen exemplary color filter configurations of symmetric multi-pixel phase-difference detectors 500, where R, G, B, C, M, Y, and Cl denote red, green, blue, cyan, magenta, yellow, and panchromatic color filters respectively. In any of the fourteen configurations, the two color filters may be switched without departing from the scope hereof. For example, in configuration (c), color filter 521 is a green filter and color filter 522 is a red filter.

TABLE 1

Exemplary color filter configurations of symmetric multi-pixel phase-difference detectors

| | filter configuration | | | | | | | | | | | | | |
|---|---|---|---|---|---|---|---|---|---|---|---|---|---|---|
| | (a) | (b) | (c) | (d) | (e) | (f) | (g) | (h) | (i) | (j) | (k) | (l) | (m) | (n) |
| color filter 521 | G | Cl | G | G | Cl | Cl | Cl | R | C | C | M | Cl | Cl | Cl |
| color filter 522 | G | Cl | R | B | R | G | B | B | Y | M | Y | C | M | Y |

Phase-detection pixels 511 and 512 may each be viewed as left pixels and together may be denoted as a left-pixel pair. Phase-detection pixels 513 and 514 may each be viewed as right pixels and together may be denoted as a right-pixel pair. Phase-detection pixels 511 and 513 may each be viewed as top pixels and together may be denoted as a top-pixel pair. Phase-detection pixels 512 and 514 may each be viewed as bottom pixels and together may be denoted as a bottom-pixel pair.

In symmetric multi-pixel phase-difference detectors 500, pixels 511-514 and their associated color filters 521 and 522 form a two-dimensional two-by-two pixel array. In an embodiment, symmetric multi-pixel phase-difference detectors 500 may include more than four pixels, e.g., eight pixels in a two-by-four array or sixteen pixels in a four-by-four array.

In an embodiment, phase-detection pixels 511-514 lack masking elements designed to prevent light from reaching photosensitive regions thereof. That is, phase-detection pixels 511-514 have no additional masking elements relative to non-phase-detection pixels of image sensor 100.

Figure 7:
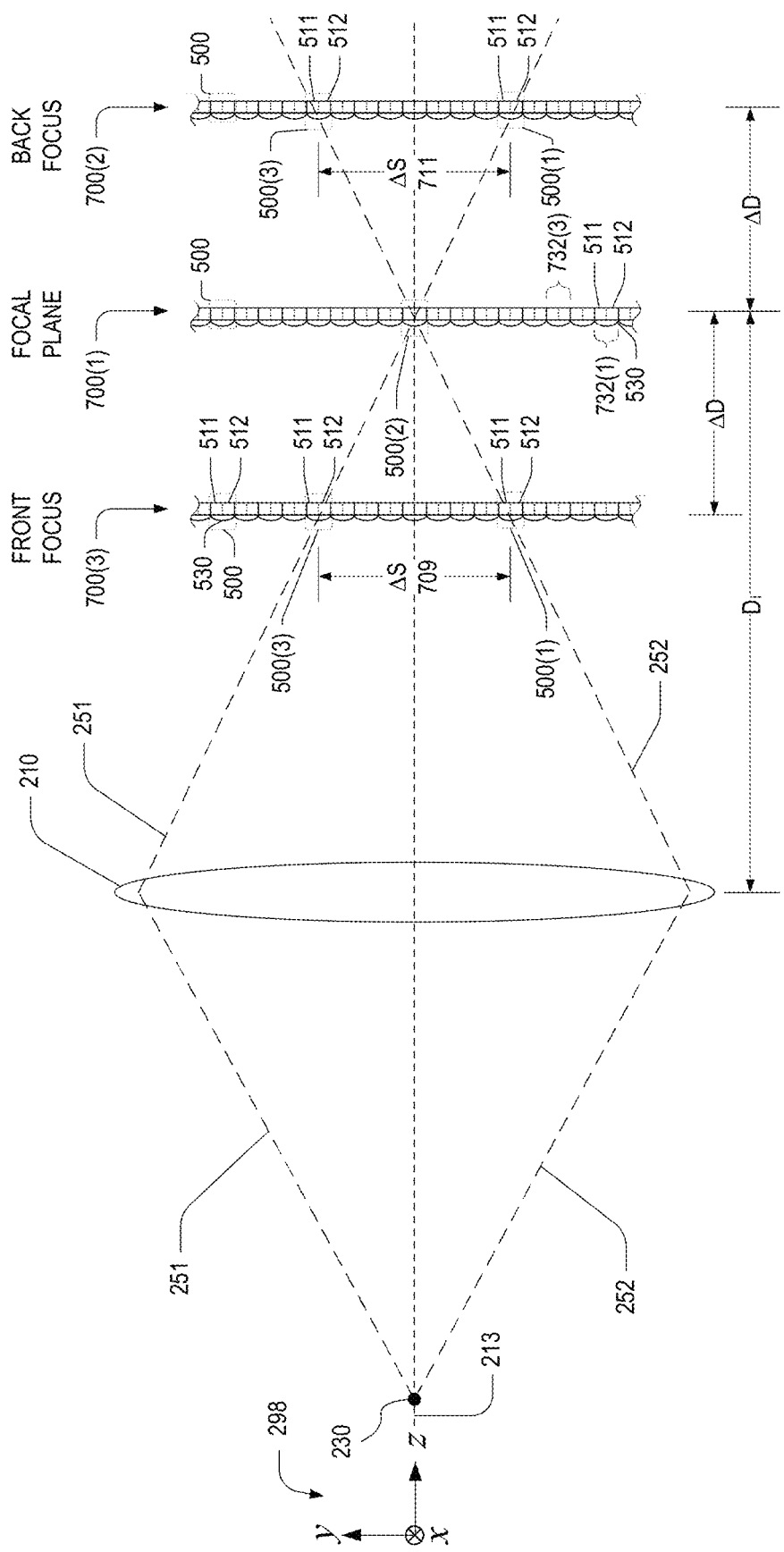
FIG. 7 shows the imaging scenario of FIG. 2 with the image sensor of FIG. 1 shown at three positions relative to the focal plane, in an embodiment.

FIG. 7 is a cross-sectional view of imaging scenario 200 with an image sensor 700 shown at three positions relative to the focal plane. Image sensor 700 is an embodiment of image sensor 100. With respect to coordinate system 298, each pixel row of image sensor 700 is in a respective plane parallel to the y-z plane, while each pixel column of image sensor 700 is in a respective plane perpendicular to the y-z plane.

Image sensor 700(1) is at the focal plane, image sensor 700(2) is behind the focal plane, and image sensor 700(3) is in front of the focal plane. The cross-sectional view of FIG. 7 is such that y-z plane of coordinate system 298 intersects phase-detection column pairs 732 of image sensor 700. A phase-detection column pair 732 is a pair of adjacent pixel columns that include one or more symmetric multi-pixel phase-difference detectors 500. An x-y plane cross-sectional view of imaging scenario 200 would be analogous to FIG. 7, but with the cross-section intersecting phase-detection row pairs.

In FIG. 7, imaging objective 210 images object edge 230 such that rays 251 and 252 are chief rays incident on at least one multi-pixel phase-difference detectors 500(1-3), depending on the position of image sensor 700. Symmetric multi-pixel phase-difference detectors 500(1) and 500(3) are separated by a distances 709 and 711 on image sensors 700(3) and 700(2) respectively. Distances 709 and 711 are analogous to distances 309 (FIGS. 3) and 411(FIG. 4) respectively.

For image sensor 700(1), rays 251 and 252 are both chief rays incident on symmetric multi-pixel phase-difference detectors 500(2).

For image sensor 700(3), rays 251 and 252 are chief rays incident on symmetric multi-pixel phase-difference detectors 500(3) and 500(1) respectively. In symmetric multi-pixel phase-difference detector 500(3), ray 251 is detected by pixel 512. In symmetric multi-pixel phase-difference detector 500(1), ray 252 is detected by pixel 511. Symmetric multi-pixel phase-difference detectors 500(3) and 500(1) are separated by a distance 709, which is equivalent to distance 409 of FIG. 4B between images 432 and 433.

Pixel 511 and pixel 512 may be denoted as a top pixel and a bottom pixel respectively, where top and bottom refer to the positive and negative y directions, respectively, in coordinate system 298. Alternatively, pixel 511 and pixel 512 may be denoted as a left pixel and a right pixel respectively, where left and right refer to the positive and negative y directions, respectively, in coordinate system 298. Whether pixels 511 and 512 are viewed as respectively top and bottom pixels or left and right pixels may depend on the orientation of imaging scenario, and hence coordinate system 298, with respect to an image horizon.

For image sensor 700(2), rays 251 and 252 are a chief rays incident on symmetric multi-pixel phase-difference detectors 500(1) and 500(3) respectively. In symmetric multi-pixel phase-difference detector 500(1), ray 251 is detected by pixel 511. In symmetric multi-pixel phase-difference detectors 500(3), ray 252 is detected by pixel 512. Symmetric multi-pixel phase-difference detectors 500(3) and 500(1) are separated by a distance 711, which is equivalent to distance 311 of FIG. 3B between images 332 and 333. In the example of image sensor 700, distance 711 equals distance 709, as both distances correspond to the separation between the same two symmetric multi-pixel phase-difference detectors 500(1) and 500(3).

In FIG. 7 and the above discussion thereof, each multi-pixel phase-difference detector 500(1-3), each with pixels 511 and 512, may be replaced with a horizontal dual-pixel phase-difference detector 540(1-3), each with pixels 541 and 542.

Figure 8:
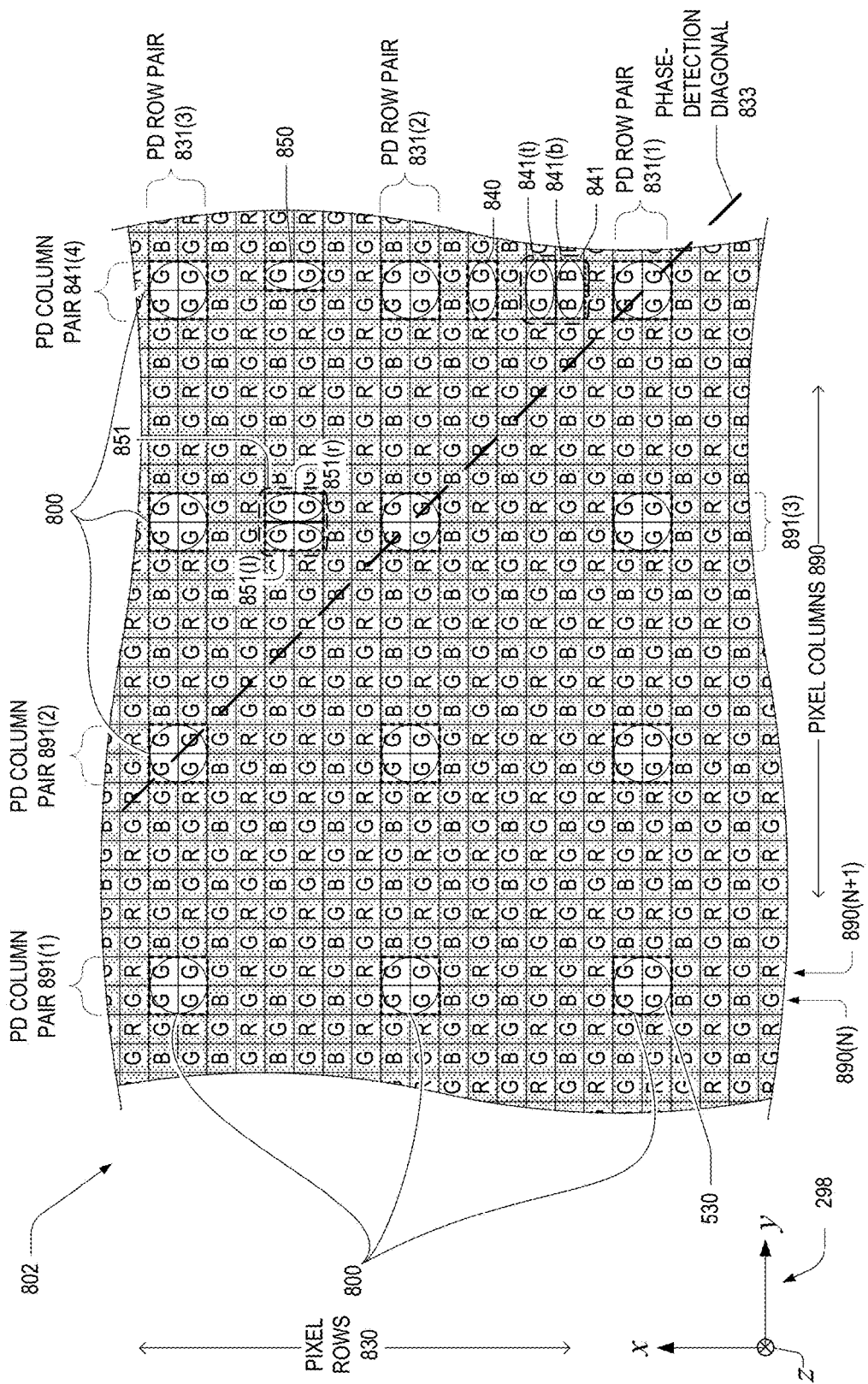
FIG. 8 is a plan view of a pixel array of the image sensor of FIG. 1, in an embodiment.

FIG. 8 is a plan view of a portion of a pixel array 802 that includes symmetric multi-pixel phase-difference detectors. Pixel array 802 is an embodiment of pixel array 102 (FIG. 1). Pixel array 802 is formed of pixel rows 830 and pixel columns 890 that are parallel to directions y and x of coordinate system 298, respectively. Pixel array 802 includes an array of color filters arranged in a Bayer pattern, as shown in FIG. 8. Each color filter covers a respective pixel of the pixel array. Red, green, and blue color filters are denoted by R, G, and B, respectively.

Pixel array 802 also includes multi-pixel phase-difference detectors 800 periodically interspersed as a square grid within the Bayer pattern. Each multi-pixel phase-difference detectors 800 occupies a phase-detection row pair, such as phase-detection row pairs 831(1-3), and a phase-detection column pair, such as phase-detection column pairs 891(1-4). Each phase-detection row pair 831 may be perpendicular to each phase-detection column pair 891. Multi-pixel phase-difference detectors 800 interspersed within the Bayer pattern in a different manner than shown in FIG. 8 without departing from the scope hereof. For example, multi-pixel phase-difference detectors 800 may form a triangular grid, a rectangular grid, or combinations thereof.

Each multi-pixel phase-difference detector 800 includes four phase-detection pixels with symmetric color filters thereon and a common microlens 530. FIG. 8 labels two pixel columns 890(N) and 840(N+1) that include a symmetric multi-pixel phase-difference detectors 800. Integers N and N+1 are pixel column indices.

Each multi-pixel phase-difference detector 800 is an embodiment of symmetric multi-pixel phase-difference detectors 500. Each multi-pixel phase-difference detector 800 has filter configuration (a) of Table 1 such that it includes four green filters 2×2 array such that filters of the same color are positioned diagonal from each other. Multi-pixel phase-difference detector 800 may have other filter configurations, such as those listed in Table 1, without departing from the scope hereof. For clarity of illustration, not all multi-pixel phase-difference detectors 800 and microlenses 530 are labeled in FIG. 8.

In an embodiment, pixel array 802 includes at least one of a horizontal dual-pixel phase-difference detector 840 and a vertical dual-pixel phase-difference detector 850. Dual-pixel phase-difference detectors 840 and 850 are embodiments of dual-pixel phase-difference detectors 540 and 550, respectively. In an embodiment, pixel array 802 includes two adjacent horizontal dual-pixel phase-difference detectors 840, as shown by a dual-pixel phase-difference detector pair 841. Dual-pixel phase-difference detector pair 841 includes a top horizontal dual-pixel phase-difference detector 841(t) and a bottom horizontal dual-pixel phase-difference detector 841(b). In an embodiment, pixel array 802 includes two adjacent vertical dual-pixel phase-difference detectors 850, as shown by a dual-pixel phase-difference detector pair 851. Dual-pixel phase-difference detector pair 851 includes a left vertical dual-pixel phase-difference detector 851(l) and a right vertical dual-pixel phase-difference detector 851(r).

Figure 9:
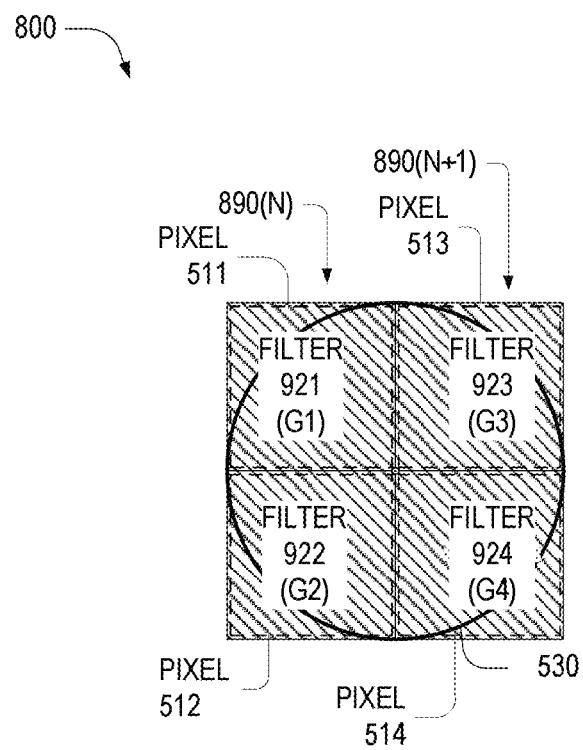
FIG. 9 is a plan view of a symmetric multi-pixel phase-difference detector of the FIG. 8 pixel array, in an embodiment.
Figure 9:
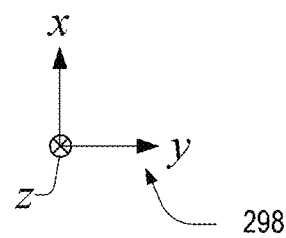

FIG. 9 is a plan view of one symmetric multi-pixel phase-difference detector 800 of pixel array 802 with green color filters 921-924, which are also labeled G1-G4 for convenience. Multi-pixel phase-difference detector 800 may be viewed as having "left-side" pixels and "right-side" pixels. Left-side pixels are 511 and 512 beneath color filters G1 and G2 in pixel column 890(N); right-side pixels are 513 and 514 beneath color filters G3 and G4 in pixel column 890(N+1).

Figure 10:
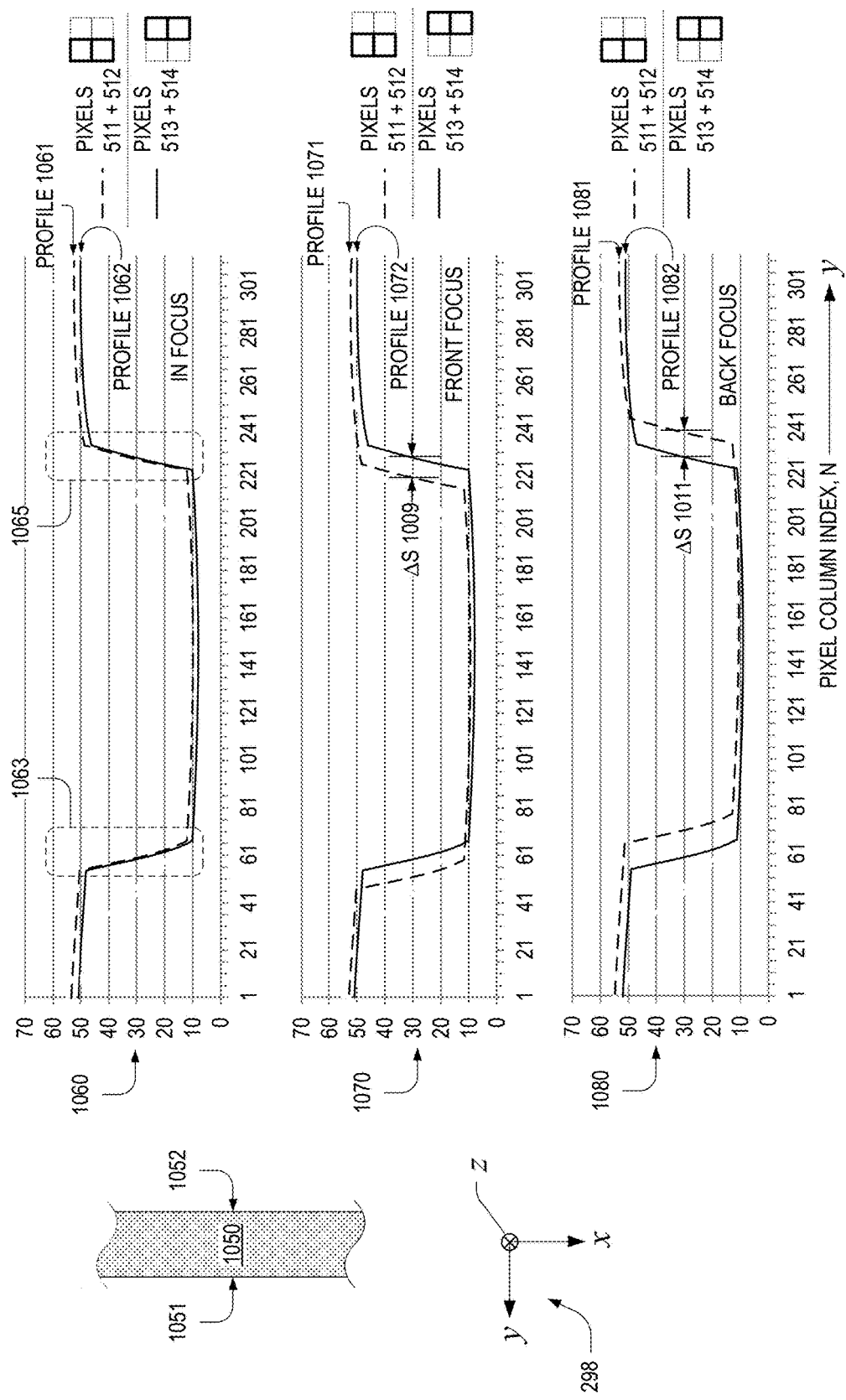
FIG. 10 shows a schematic graph of pixel values of a common phase-detection row pair of the FIG. 8 pixel array in response to imaging an object with vertically-oriented edges, in an embodiment.

FIG. 10 shows a schematic graph of pixel values vs. pixel column index of multi-pixel phase-difference detectors 800 in a common phase-detection row pair (831(1) for example), in response to imaging an object 1050 with vertically-oriented edges 1051 and 1052 on pixel array 802.

Dashed horizontal line profiles 1061, 1071, and 1081 of plots 1060, 1070, and 1080 respectively, may represent the pixel response of the "left-side" pixels of multi-pixel phase-difference detector 800. Pixels 511 and 512 constitute a first vertically-oriented pixel subset of multi-pixel phase-difference detector 800. Solid horizontal line profiles 1062, 1072, and 1082 of plots 1060, 1070, and 1080 respectively represent the pixel response of the "right-side" pixels of multi-pixel phase-difference detector 800. Pixels 513 and 514 constitute a second vertically-oriented pixel subset of multi-pixel phase-difference detector 800.

Alternatively, dashed horizontal line profiles 1061, 1071, and 1081 of plots 1060, 1070, and 1080 respectively, may represent the pixel response of one vertical dual-pixel phase-difference detector 851(l) of one dual-pixel phase-difference detector pair 851. Similarly, solid horizontal line profiles 1062, 1072, and 1082 of plots 1060, 1070, and 1080 respectively may represent the pixel response of one dual-pixel phase-difference detector 851(r) of one dual-pixel phase-difference detector pair 851.

Plot 1060 is an image of object 1050 with both edges 1051 and 1052 in focus, as shown in regions 1063 and 1065 where line profiles 1061 and 1062 overlap. In plot 1070, edges 1051 and 1052 are out of focus (front-focused), as indicated by distance 1009 between line profiles 1071 and 1072. Distance 1009 is an example of distance 409. In plot 1080, edges 1051 and 1052 are out of focus (back-focused), as indicated by distance 1011 between line profiles 1081 and 1082. Distance 1011 is an example of distance 311.

Figure 11:
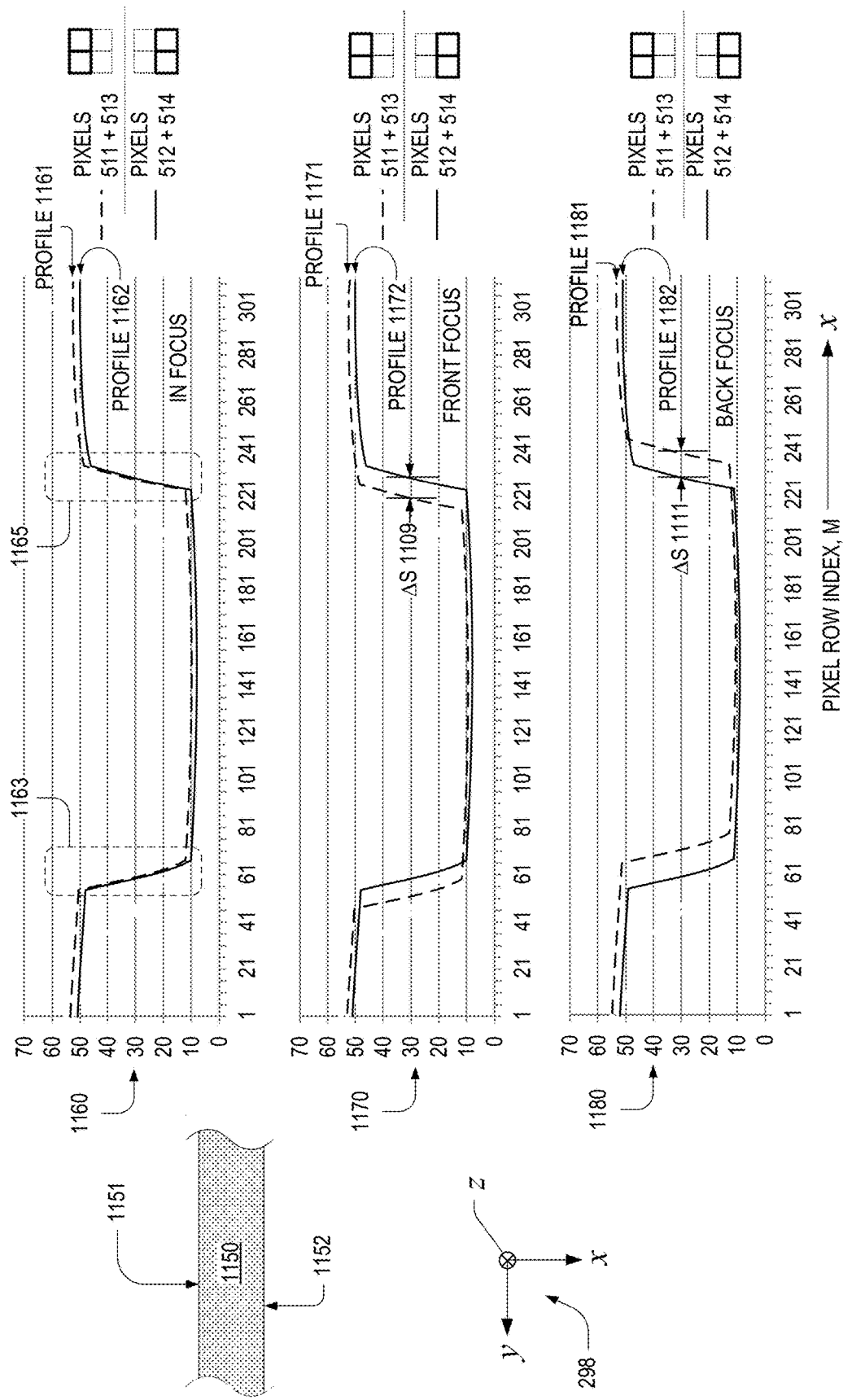
FIG. 11 shows a schematic graph of pixel values of a common phase-detection column pair of the FIG. 8 pixel array in response to imaging an object with horizontally-oriented edges, in an embodiment.

FIG. 11 shows a schematic graph of pixel values vs. pixel column index of symmetric multi-pixel phase-difference detectors 800 in a common phase-detection column pair (891(1) for example), in response to imaging object 1150 with horizontally-oriented edges 1151 and 1152 on pixel array 802.

Dashed vertical line profiles 1161, 1171, and 1181 of plots 1160, 1170, and 180 respectively, represent the pixel response of the "top" pixels of multi-pixel phase-difference detector 800. Pixels 511 and 513 constitute a first vertically-oriented pixel subset of multi-pixel phase-difference detector 800. Solid vertical line profiles 1162, 1172, and 1182 of plots 1160, 1170, and 1180 represent the pixel response of the "bottom" pixels of multi-pixel phase-difference detector 800. Pixels 512 and 514 constitute a second vertically-oriented pixel subset of multi-pixel phase-difference detector 800.

Alternatively, dashed horizontal line profiles 1161, 1171, and 1181 of plots 1160, 1170, and 1180 respectively, may represent the pixel response of one horizontal dual-pixel phase-difference detector 841(t) one dual-pixel phase-difference detector pair 841. Similarly, solid horizontal line profiles 1162, 1172, and 1182 of plots 1160, 1170, and 1180 respectively may represent the pixel response of one dual-pixel phase-difference detector 841(b) of one dual-pixel phase-difference detector pair 841.

Plot 1160 is an image of object 1150 with both edges 1151 and 1152 in focus, as shown in regions 1163 and 1165 where line profiles 1161 and 1162 overlap. In plot 1170, edges 1151 and 1152 are out of focus (front-focused), as indicated by distance 1109 between line profiles 1171 and 1172. Distance 1109 is an example of distance 409. In plot 1180, edges 1151 and 1152 are out of focus (back-focused), as indicated by distance 1111 between line profiles 1081 and 1082. Distance 1111 is an example of distance 311.

Figure 12:
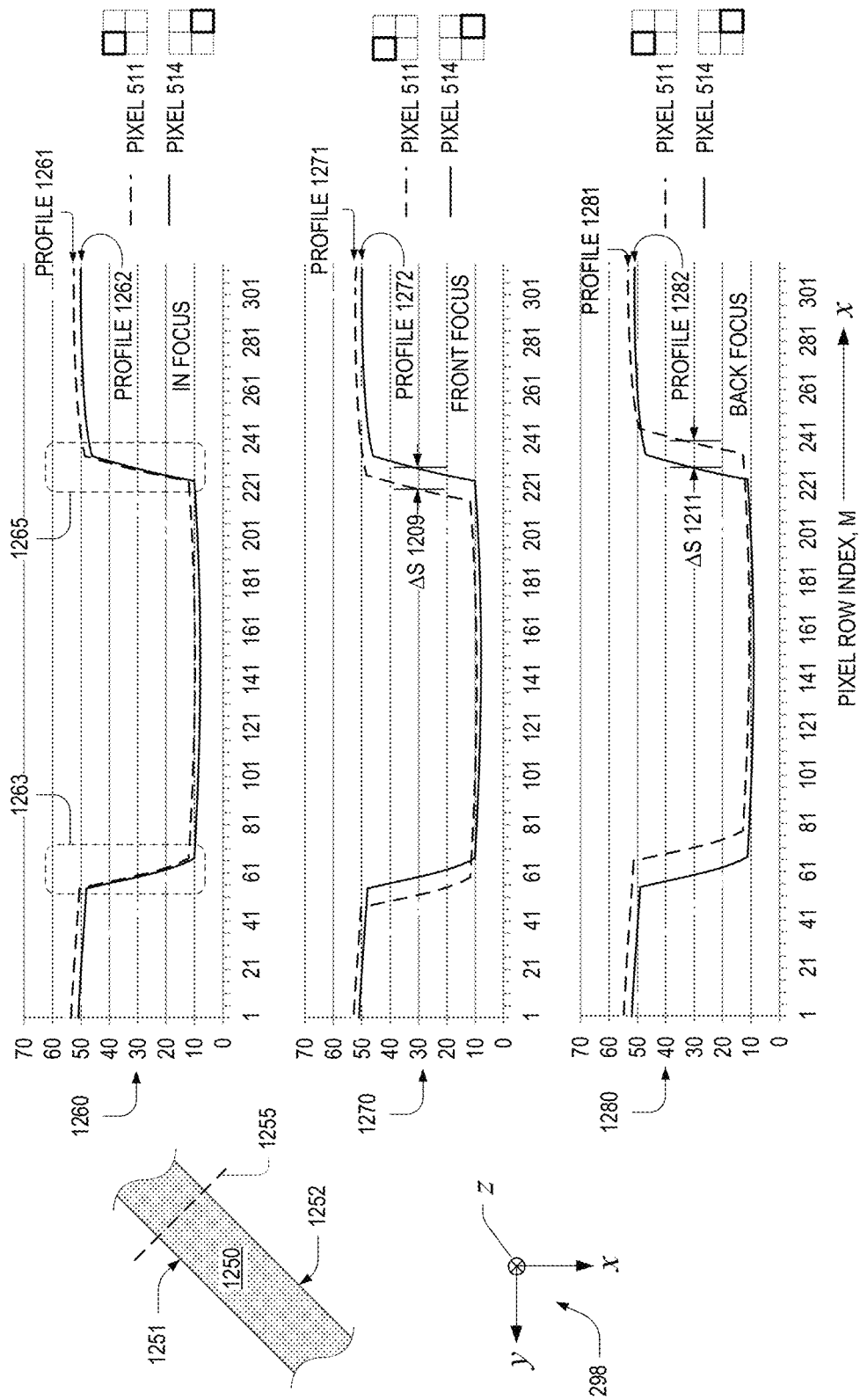
FIG. 12 shows a schematic graph of pixel values of a phase-detection diagonal of the FIG. 8 pixel array in response to imaging an object with an obliquely-oriented edge, in an embodiment.

FIG. 12 shows a schematic graph of pixel values vs. pixel column index of symmetric multi-pixel phase-difference detectors 800 in a common phase-detection diagonal 833 (FIG. 8), in response to imaging a diagonally-oriented object 1250 on pixel array 802 along a cross-section 1255. Without departing from the scope hereof, diagonally-oriented object 1250 may be oriented at an arbitrary angles with respect to the y-axis of coordinate system 298.

Plot 1260 is an image of object 1250 with both edges 1251 and 1252 in focus, as shown in regions 1263 and 1265 where profiles 1261 and 1262 overlap. In plot 1270, edges 1251 and 1252 are out of focus (front-focused), as indicated by distance 1209 between profiles 1271 and 1272. Distance 1209 is an example of distance 409. In plot 1280, edges 1251 and 1252 are out of focus (back-focused), as indicated by distance 1211 between profiles 1281 and 1282. Distance 1211 is an example of distance 311.

Dashed line profiles 1261, 1271, and 1281 of plots 1260, 1270, and 1280 respectively, represent the pixel response of the upper-left pixels of multi-pixel phase-difference detectors 800, e.g., pixel 511, along one phase-detection diagonal 833. Solid line profiles 1262, 1272, and 1282 of plots 1260, 1270, and 1280 respectively represent the pixel response of the lower-right pixel of multi-pixel phase-difference detector 800, e.g., pixel 514, along one phase-detection diagonal 833. Cross-section 1255 is for example parallel to phase-detection diagonal 833.

Figure 13:
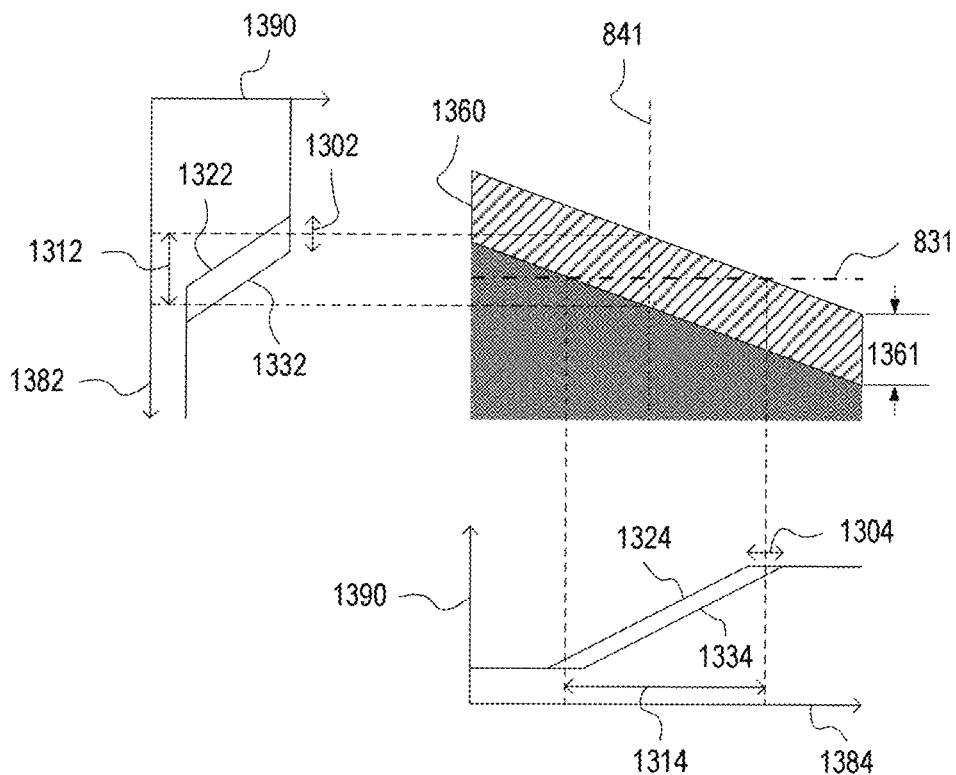
FIG. 13 illustrates detection and phase-shift measurement of one exemplary arbitrarily oriented edge by the image sensor of FIG. 1, in an embodiment.

FIG. 13 illustrates detection and phase-shift measurement of one exemplary arbitrarily oriented edge 1360 by image sensor 100 (FIG. 1). Edge 1360 has a width 1361 and is an image of a transition between two areas of different brightness and/or color in scene 150. The extent of edge 1360 is determined by (a) the actual extent of the transition in scene 150 and (b) the degree of misfocus of the image of the transition.

Bottom pixels 512 and 514 (FIGS. 5 and 9) and top pixels 511 and 513 of a phase-detection column pair 891 generate electrical signals indicating vertical line profiles 1322 and 1332 for edge 1360 along phase-detection column pair 891. Line profiles 1322 and 1332 are plotted as brightness and/or color measurement 1390 versus vertical position 1382. Bottom pixels 512 and 514 produce one of vertical line profiles 1322 and 1332, while top pixels 511 and 513 produce the other one of vertical line profiles 1322 and 1332. Edge 1360 is apparent in each of line profiles 1322 and 1332 as a change in brightness and/or color measurement 1390. Each of line profiles 1322 and 1332 provide a measurement of the extent 1312 of edge 1360 along phase-detection column pair 891. Together, line profiles 1322 and 1332 provide a measurement of the misfocus-induced phase shift 1302 between line profiles 1322 and 1332.

Left pixels 511 and 512 and right pixels 513 and 514 of a phase-detection row pair 831 generate electrical signals indicating horizontal line profiles 1324 and 1334 for edge 1360 along phase-detection row pair 831. Line profiles 1324 and 1334 are plotted as brightness and/or color measurement 1390 versus horizontal position 1384. Left pixels 511 and 512 produce one of horizontal line profiles 1324 and 1334, while right pixels 513 and 514 produce the other one of horizontal line profiles 1324 and 1334. Edge 1360 is apparent in each of line profiles 1324 and 1334 as a change in brightness and/or color measurement 1390. Each of line profiles 1324 and 1334 provide a measurement of the extent 1314 of edge 1360 along phase-detection row pair 831. Together, line profiles 1324 and 1334 provide a measurement of misfocus-induced phase shift 1304 between line profiles 1324 and 1334.

If the optical system that images scene 150 onto image sensor 100 is free of astigmatism, misfocus-induced phase shift 1304 is the same as misfocus-induced phase shift 1302. If, on the other hand, the optical system is astigmatic, misfocus-induced phase shift 1304 may be different from misfocus-induced phase shift 1302.

The accuracy of misfocus-induced phase shift 1302 increases as extent 1312 decreases toward its minimum value, which is width 1361. Similarly, the accuracy of misfocus-induced phase shift 1304 decreases as extent 1314 decreases toward its minimum value, which is also width 1361. In the example of FIG. 13, edge 1360 has a greater horizontal component than vertical component. Therefore, extent 1312 is significantly smaller than extent 1314. Assuming no or negligible astigmatism, misfocus-induced phase shift 1302 is the same as misfocus-induced phase shift 1304. Accordingly, phase-detection column pair 891 provides a better phase-shift measurement than phase-detection row pair 831.

The example of FIG. 13 is for an ideal situation. If further accounting for non-idealities, such as noise and/or interfering features in the scene, aberrations of the optical system, and electronic noise of image sensor 100, line profiles 1322, 1332, 1324, and 1334 may be substantially noisier than what is shown in FIG. 13. In such situations, misfocus-induced phase shift 1304 may be undetectable, and only phase-detection column pair 891 is capable of providing a measurement of the misfocus-induced phase shift associated with edge 1360.

It follows from the above discussion that phase-detection column pair 891 provides a better phase-shift measurement for near-horizontal edges than phase-detection row pair 831, while phase-detection row pair 831 provides a better phase-shift measurement for near-vertical edges than phase-detection column pair 891. It also follows that phase-detection column pair 891 is unable to enable measurement of the phase shift for vertical edges, and depending on non-ideal properties discussed above, may be unable to enable measurement of the phase shift for near-vertical edges. Likewise, phase-detection row pair 831 is unable to enable measurement of the phase shift for horizontal edges, and depending on non-ideal properties discussed above, may be unable to enable measurement of the phase shift for near-horizontal edges. Consequently, accuracy of an image sensor 100 improves when it includes both phase-detection row pairs 831 and phase-detection column pairs 891.

Figure 14:
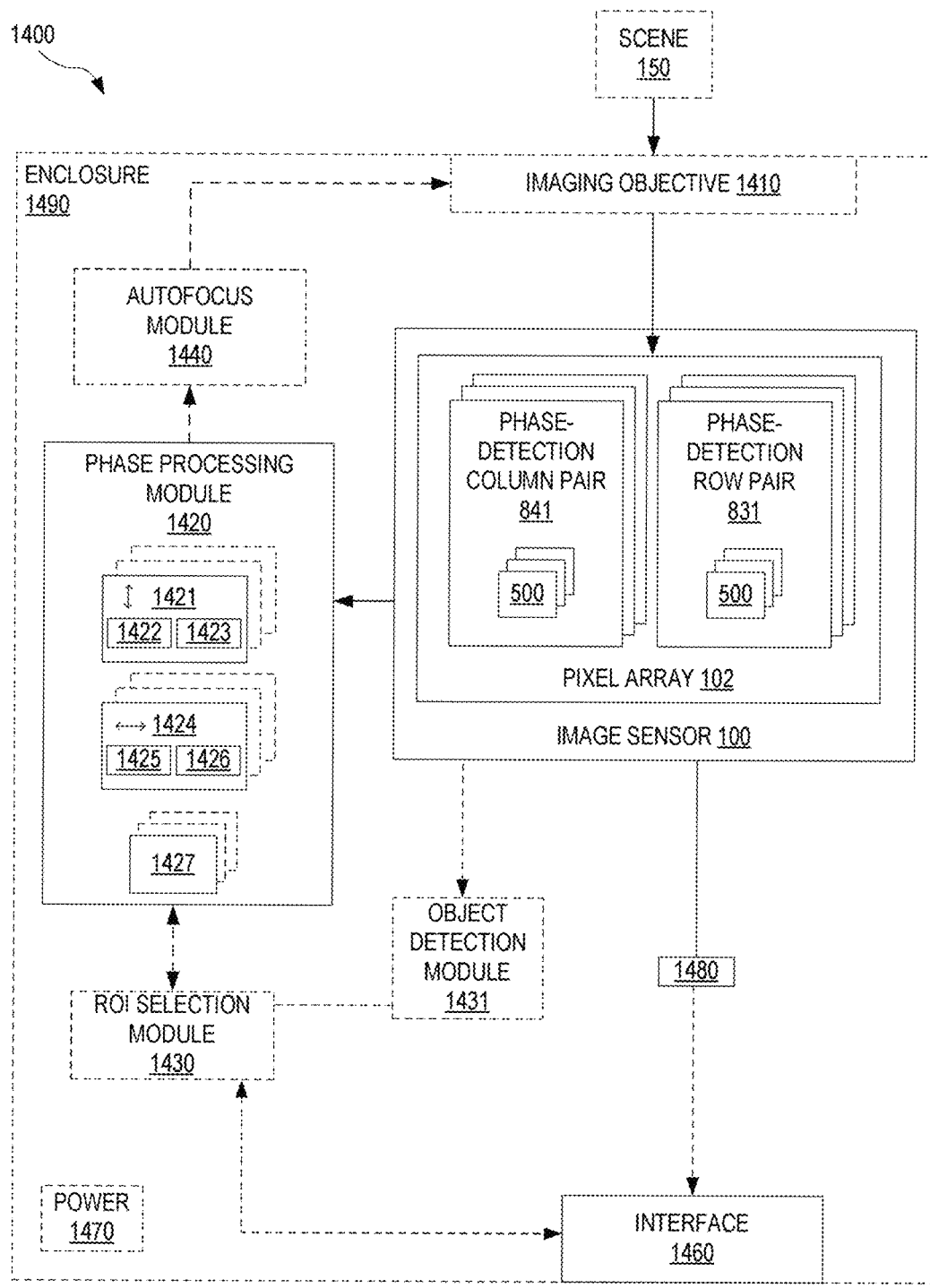
FIG. 14 illustrates an imaging system with symmetric multi-pixel phase-difference detectors, in an embodiment.

FIG. 14 illustrates one exemplary imaging system 1400 with symmetric multi-pixel phase-difference detectors. Imaging system 1400 includes image sensor 100 (FIG. 1), a phase-processing module 1420, and an interface 1460.

Interface 1460 is an interface that handles communication between imaging system 1400 and a user and/or an external system such as a computer. Interface 1460 may include user interface devices such as a display, a touch screen, and/or a keyboard. Interface 1460 may include wired (such as Ethernet, USB, FireWire, or Thunderbolt) and/or wireless (such as Wi-Fi or Bluetooth) connections for communicating images to a user or an external system.

For each phase-detection row pair 831, or each one of several portions of each phase-detection row pair 831, considered by phase-processing module 1420, phase-processing module 1420 processes electrical signals generated by left pixels 511 and 512 and right pixels 513 and 514 to determine a horizontal line profile pair 1424 that includes a horizontal line profile 1425 and a horizontal line profile 1426. Phase-processing module 1420 determines horizontal line profile 1425 and horizontal line profile 1426 based upon electrical signals received from left pixels 511 and 512 and right pixels 513 and 514, respectively. Examples of horizontal line profiles 1425 and 1426 include line profiles 1061, 1062, 1071, 1072, 1081, and 1082 of FIG. 10.

For each phase-detection column pair 891 (FIG. 8), or each one of several portions of each phase-detection column pair 891, considered by phase-processing module 1420, phase-processing module 1420 processes electrical signals generated by bottom pixels 512 and 514 (FIG. 6) and top pixels 511 and 513 to determine a vertical line profile pair 1421 that includes of a vertical line profile 1422 and a vertical line profile 1423. Phase-processing module 1420 determines vertical line profile 1422 and vertical line profile 1423 based upon electrical signals received from bottom pixels 512 and 514 and top pixels 511 and 513, respectively. Examples of vertical line profiles 1422 and 1423 include line profiles 1161, 1162, 1171, 1172, 1181, and 1182 of FIG. 11.

Based upon at least one of vertical line profile pair 1421 and horizontal line profile pair 1424, phase-processing module 1420 detects an edge (such as edge 1360) in an image formed on pixel array 102 and determines associated phase shifts 1427. The edge, thus detected by phase-processing module 1420, may have arbitrary orientation relative to pixel array 102.

Although image sensor 100 is shown in FIG. 14 as having three of each of phase-detection column pairs 891, phase-detection rows pairs 831, bottom pixels 512 and 514, top pixels 511 and 513, left pixels 511 and 512, and right pixels 513 and 514, actual numbers may be different, without departing from the scope hereof.

In an embodiment, imaging system 1400 includes an autofocus module 1440 and an imaging objective 1410. Imaging objective 1410 is for example imaging objective 210 of FIGS. 2, 3, 4, and 7. Based upon phase shifts 1427 received from phase-processing module 1420, autofocus module 1440 adjusts imaging objective 1410 to form an image of scene 150 (FIG. 1) on image sensor 100, from which image sensor 100 generates image data 1480. For example, autofocus module 1440 may adjust imaging objective 1410 to minimize phase shifts 1427. Scene 150 may include object edges such as edges 1051, 1052, 1151, 1152, and 1360.

In an embodiment, imaging system 1400 includes a region-of-interest (ROI) selection module 1430 that selects an ROI, within pixel array 102, to be processed by phase-processing module 1420. ROI selection module 1430 may receive ROI specification from one of interface 1460 and an object-detection module 1431. Object-detection module 1431 is for example a face-detection module. Alternatively, or in combination therewith, ROI selection module 1430 receives, from phase-processing module 1420, locations of edge(s) with respect to pixel array 102 and, based thereupon, determines an ROI specification.

Imaging system 1400 may further include one or both of an enclosure 1490 and a power supply 1470.

Figure 15:
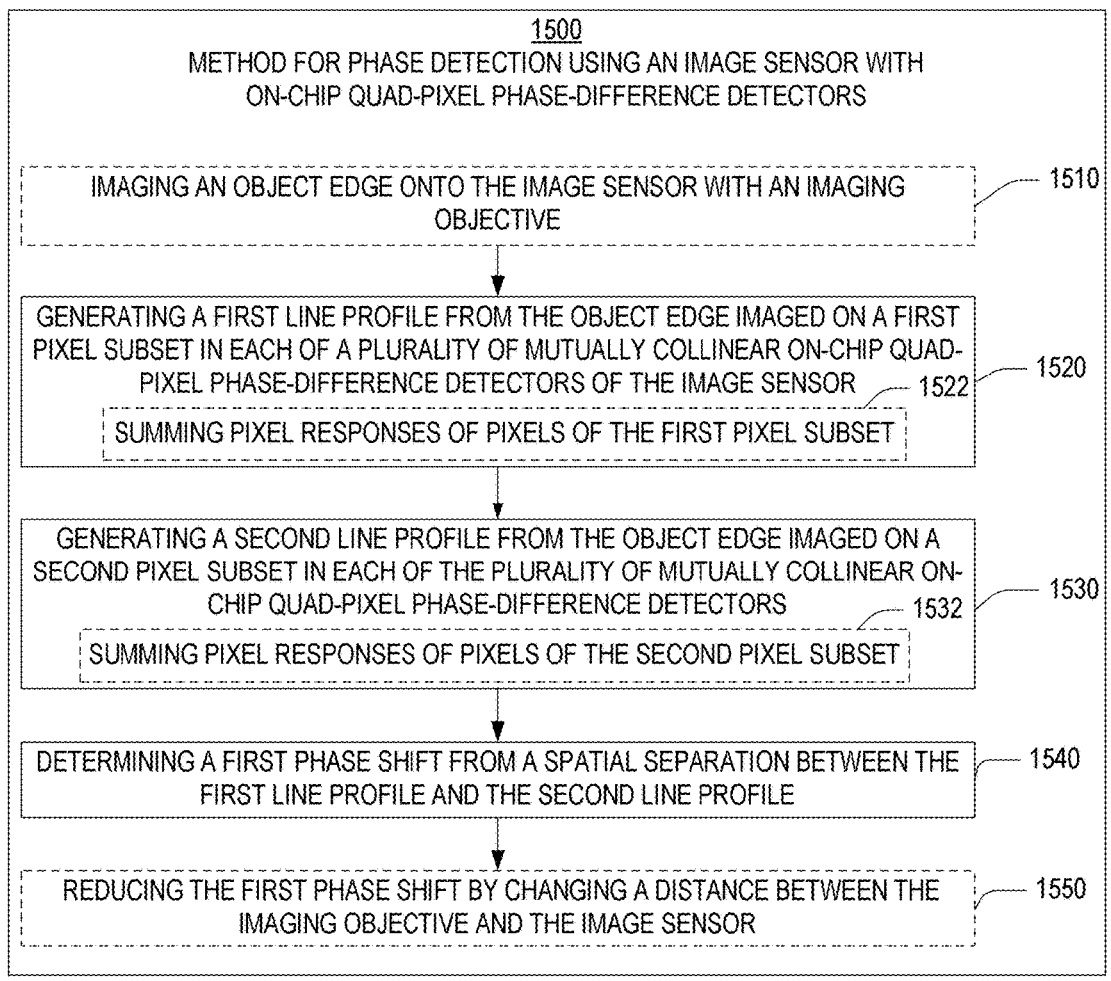
FIG. 15 is a flowchart illustrating a method for phase detection using an image sensor of FIG. 1, in an embodiment.

FIG. 15 is a flowchart illustrating a method 1500 for phase detection using an image sensor with symmetric multi-pixel phase-difference detectors.

Step 1510 is optional. In step 1510, method 1500 images an object edge onto the image sensor with an imaging objective. In an example of step 1510, scene 150 is imaged onto image sensor 100 with imaging objective 1410 of imaging system 1400 (FIG. 14).

In step 1520, method 1500 generates a first line profile from the object edge imaged on a first pixel subset in each of a plurality of mutually collinear symmetric multi-pixel phase-difference detectors of the image sensor. In an example of step 1520, horizontal line profile 1425 is imaged on one phase-detection column pair 891 of image sensor 100. Horizontal line profile 1425 is for example first line profile 1071 (FIG. 10) generated from object edges 1051 and 1052 imaged on a first pixel subset—pixels 511 and 512—in each mutually collinear symmetric multi-pixel phase-difference detectors 500 of image sensor 100.

Step 1520 may include optional step 1522. In step 1522, method 1500 sums pixel responses of pixels in the first pixel subset. In an example of step 1522, pixel responses of pixels 511 and 512 are summed to yield first line profile 1071.

In step 1530, method 1500 generates a second line profile from the object edge imaged on a second pixel subset in each of a plurality of mutually collinear symmetric multi-pixel phase-difference detectors of the image sensor. In an example of step 1520, horizontal line profile 1426 is imaged on one phase-detection column pair 891. Horizontal line profile 1426 is for example second line profile 1072 (FIG. 10) generated from object edges 1051 and 1052 imaged on a second pixel subset—pixels 513 and 514—in each mutually collinear symmetric multi-pixel phase-difference detector 500 of image sensor 100.

Step 1530 may include optional step 1532. In step 1532, method 1500 sums pixel responses of pixels in the second pixel subset. In an example of step 1532, pixel responses of pixels 513 and 514 are summed to yield second line profile 1072.

In step 1540, method 1500 determines a first phase shift from a spatial separation between the first line profile and the second line profile. In an example of step 1540, phase-processing module 1420 determines one phase shift 1427, for example, distance 1009 between line profiles 1071 and 1072.

Step 1550 is optional. In step 1550, method 1500 reduces the first phase shift by changing a distance between the imaging objective and the image sensor. In an example of step 1550, autofocus module 1440 reduces phase shift 1427 changing a distance between imaging objective 1410 and image sensor 100.

Figure 16:
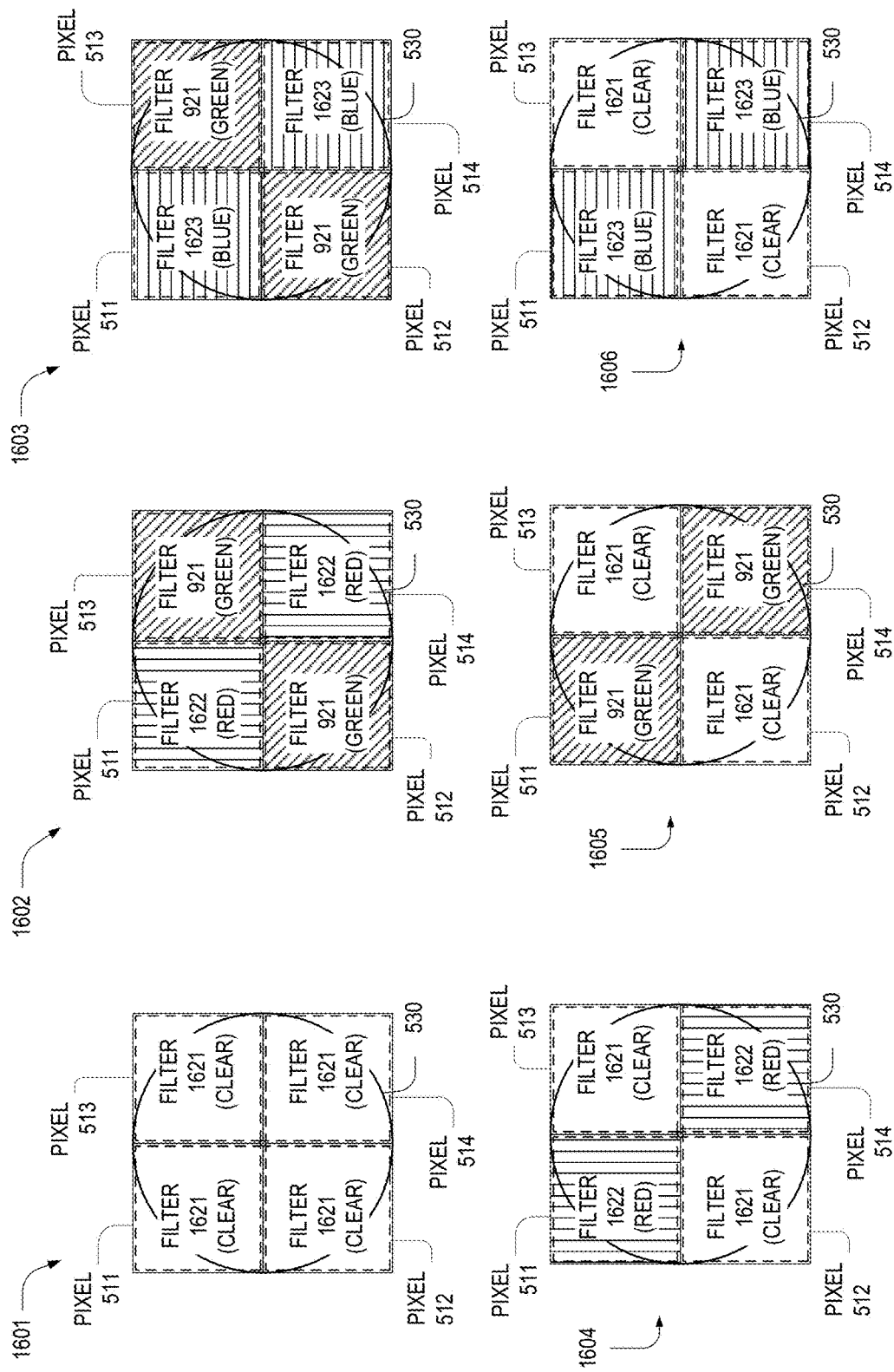
FIG. 16 is a plan view of exemplary symmetric multi-pixel phase-difference detectors that are embodiments of symmetric multi-pixel phase-difference detector of FIG. 5.

FIG. 16 is a plan view of exemplary symmetric multi-pixel phase-difference detectors 1601-1606, which are embodiments of symmetric multi-pixel phase-difference detector 500. Symmetric multi-pixel phase-difference detector 1601 is identical to symmetric multi-pixel phase-difference detector 500 where each color filter 521 and 522 is a panchromatic (clear) color filter 1621. Symmetric multi-pixel phase-difference detector 1602 is identical to symmetric multi-pixel phase-difference detector 500 where each color filter 521 is a red color filter 1622 and each color filter 522 is a green color filter 921. Symmetric multi-pixel phase-difference detector 1603 is identical to symmetric multi-pixel phase-difference detector 500 where each color filter 521 is a blue color filter 1623 and each color filter 522 is a green color filter 921. Symmetric multi-pixel phase-difference detectors 1604-1606 are identical to symmetric multi-pixel phase-difference detector 500 where each color filter 522 is a clear color filter 1621 and each color filter 521 is a red color filter 1621, green color filter 921, and a blue color filter 1623 respectively.

Combinations of Features.

Features described above as well as those claimed below may be combined in various ways without departing from the scope hereof. The following examples illustrate some possible, non-limiting combinations:

(A1) An image sensor may include symmetric multi-pixel phase-difference detectors. Each symmetric multi-pixel phase-difference detector includes (a) a plurality of pixels forming an array and each having a respective color filter thereon, each color filter having a transmission spectrum and (b) a microlens at least partially above each of the plurality of pixels and having an optical axis intersecting the array. The array, by virtue of each transmission spectrum, has reflection symmetry with respect to at least one of (a) a first plane that includes the optical axis and (b) a second plane that is orthogonal to the first plane.

(A2) In the image sensor denoted as (A1), the array may be a planar array.

(A3) In either or both image sensors denoted as (A1) and (A2), the optical axis may intersect the array at a 90-degree angle.

(A4) Any of the image sensors denoted as (A1) through (A3), may further include a phase-detection row pair that includes a plurality of symmetric multi-pixel phase-difference detectors in a pair of adjacent pixel rows; and a phase-detection column pair that includes a plurality of symmetric multi-pixel phase-difference detectors in a pair of adjacent pixel columns.

(A5) In any of the image sensors denoted as (A1) through (A4), the plurality of pixels may be four in number and arranged as a 2×2 planar array.

(A6) In any of the image sensors denoted as (A1) through (A5), the array, by virtue of each transmission spectrum, having reflection symmetry with respect to both (a) a first plane that includes the optical axis and (b) a second plane that is orthogonal to the first plane.

(A7) In any of the image sensors denoted as (A5), the color filter on two of the plurality of pixels may each have a first transmission spectrum; the color filter on the remaining two of the plurality of pixels may each have a second transmission spectrum.

(A8) In any of the image sensors denoted as (A7), the first transmission spectrum and the second transmission spectrum may correspond to the transmission spectrum of one of a red color filter, a blue color filter, a green color filter, a cyan color filter, a magenta color filter, a yellow color filter, and a panchromatic color filter.

(B1) An imaging system with on-chip phase-detection may include a phase-detection row pair, a phase-detection column pair, and a phase-processing module. The phase-detection row pair is capable of measuring a pair of horizontal line profiles for light incident from left and right directions and includes a plurality of symmetric multi-pixel phase-difference detectors in a pair of adjacent pixel rows. The phase-detection column pair is capable of measuring a pair of vertical line profiles for light incident from top and bottom directions and includes a plurality of symmetric multi-pixel phase-difference detectors in a pair of adjacent pixel columns. The phase-processing module is capable of processing the pair of horizontal line profiles and the pair of vertical line profiles to measure phase shift associated with an arbitrarily-oriented and arbitrarily-located edge in the scene.

(B2) The imaging system denoted as (B1) may further include an autofocus module for adjusting focus of an imaging objective to reduce the phase shift.

(C1) A method for phase detection using an image sensor with symmetric multi-pixel phase-difference detectors may include generating a first line profile and a second line profile, and determining a first phase shift from a spatial separation between the first line profile and the second line profile. The first line profile is generated from an object edge imaged on a first pixel subset in each of a plurality of mutually collinear symmetric multi-pixel phase-difference detectors of the image sensor. The second line profile is generated from the object edge imaged on a second pixel subset in each of the plurality of mutually collinear symmetric multi-pixel phase-difference detectors.

(C2) In the method denoted as (C1), the step of generating the first line profile may include summing pixel responses of pixels of the first pixel subset. The step of generating the second line profile may include summing pixel responses of pixels of the second pixel subset.

(C3) In the method denoted as (C2), the step of summing pixel responses of pixels of the first pixel subset may include summing pixel responses of a pair of two adjacent pixels of the first pixel subset. The step of summing pixel responses of pixels of the second pixel subset may include summing pixel responses of a pair of two adjacent pixels of the second pixel subset not included in the first pixel subset.

(C4) In any of the methods denoted as (C1) through (C3), each multi-pixel phase-difference detectors may be mutually collinear in a first direction parallel to one of (i) pixel rows of the image sensor and (ii) pixel columns of the image sensor.

(C5) Any of the methods denoted as (C1) through (C4) may further include: (a) generating a third line profile from an object edge imaged on a first pixel subset in each of a second plurality of multi-pixel phase-difference detectors of the image sensor that are mutually collinear in a second direction that is perpendicular to the first direction, (b) generating a fourth line profile from the object edge imaged on a second pixel subset in each of the second plurality of mutually collinear symmetric multi-pixel phase-difference detectors, and (c) determining a second phase shift from a spatial separation between the first line profile and the second line profile.

(C6) Any of the methods denoted as (C1) through (C6) may further include imaging the object edge onto the image sensor with an imaging objective.

(C7) The method denoted as (C6) may further include reducing the first phase shift by changing a distance between the imaging objective and the image sensor.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. An image sensor with symmetric multi-pixel phase-difference detectors, each symmetric multi-pixel phase-difference detector comprising:
    four pixels forming a 2×2 array and each having a respective color filter thereon, each color filter having a respective transmission spectrum; and
    a microlens at least partially above each of the four pixels and having an optical axis intersecting the 2×2 array,
    the 2×2 array, by virtue of the respective transmission spectra, having reflection symmetry with respect to at least one of (a) a first plane that includes the optical axis and (b) a second plane that is orthogonal to the first plane and is parallel to the optical axis.

2. The image sensor of claim 1, the 2×2 array being a planar array.

3. The image sensor of claim 1, the optical axis intersecting the 2×2 array at a 90-degree angle.

4. The image sensor of claim 1, further comprising:
    a phase-detection row pair that includes a plurality of the symmetric multi-pixel phase-difference detectors in a pair of adjacent pixel rows; and
    a phase-detection column pair that includes a plurality of the symmetric multi-pixel phase-difference detectors in a pair of adjacent pixel columns.

5. The image sensor of claim 1, the 2×2 array, by virtue of the respective transmission spectra having reflection symmetry with respect to both (a) a first plane that includes the optical axis and (b) a second plane that is orthogonal to the first plane.

6. The image sensor of claim 1, the color filters on two of the four pixels each having a first transmission spectrum, the color filters on the remaining two of the of four pixels each having a second transmission spectrum.

7. The image sensor of claim 6, the first transmission spectrum and the second transmission spectrum each corresponding to the transmission spectrum of one of a red color filter, a blue color filter, a green color filter, a cyan color filter, a magenta color filter, a yellow color filter, and a panchromatic color filter.

8. An imaging system with on-chip phase-detection, comprising:
   a phase-detection row pair, for measuring a pair of horizontal line profiles for light incident from left and right directions, that includes a plurality of symmetric multi-pixel phase-difference detectors in a pair of adjacent pixel rows;
   a phase-detection column pair, for measuring a pair of vertical line profiles for light incident from top and bottom directions, respectively, that includes a plurality of symmetric multi-pixel phase-difference detectors in a pair of adjacent pixel columns; and
   a phase-processing module for processing the pair of horizontal line profiles and the pair of vertical line profiles to measure phase shift associated with an arbitrarily-oriented and arbitrarily-located edge in the scene,
   each symmetric multi-pixel phase-difference detector including (i) four pixels forming a 2×2 array and each having a respective color filter thereon, each color filter having a respective transmission spectrum, and (ii) a microlens at least partially above each of the four pixels and having an optical axis intersecting the 2×2 array, the 2×2 array, by virtue of the respective transmission spectra, having reflection symmetry with respect to at least one of (a) a first plane that includes the optical axis and (b) a second plane that is orthogonal to the first plane and is parallel to the optical axis.

9. The imaging system of claim 8, further comprising an autofocus module for adjusting focus of an imaging objective to reduce the phase shift.

10. A method for phase detection using an image sensor with symmetric multi-pixel phase-difference detectors, the method comprising:
   generating a first line profile from an object edge imaged on a first pixel subset in each of a plurality of mutually collinear symmetric multi-pixel phase-difference detectors of the image sensor;
   generating a second line profile from the object edge imaged on a second pixel subset in each of the plurality of mutually collinear symmetric multi-pixel phase-difference detectors; and
   determining a first phase shift from a spatial separation between the first line profile and the second line profile,
   each symmetric multi-pixel phase-difference detector including (i) four pixels forming a 2×2 array and each having a respective color filter thereon, each color filter having a respective transmission spectrum, (ii) a microlens at least partially above each of the four pixels and having an optical axis intersecting the 2×2 array, the 2×2 array, by virtue of the respective transmission spectra, having reflection symmetry with respect to at least one of (a) a first plane that includes the optical axis and (b) a second plane that is orthogonal to the first plane and is parallel to the optical axis.

11. The method of claim 10,
   the step of generating the first line profile comprising summing pixel responses of pixels of the first pixel subset; and
   the step of generating the second line profile comprising summing pixel responses of pixels of the second pixel subset.

12. The method of claim 10, the step of summing pixel responses of pixels of the first pixel subset comprising summing pixel responses of a pair of two adjacent pixels of the first pixel subset; and the step of summing pixel responses of pixels of the second pixel subset comprising summing pixel responses of a pair of two adjacent pixels of the second pixel subset not included in the first pixel subset.

13. The method of claim 10, the symmetric multi-pixel phase-difference detectors being mutually collinear in a first direction parallel to one of (i) pixel rows of the image sensor and (ii) pixel columns of the image sensor.

14. The method of claim 13, further comprising:
   generating a third line profile from an object edge imaged on a first pixel subset in each of a second plurality of symmetric multi-pixel phase-difference detectors of the image sensor that are mutually collinear in a second direction that is perpendicular to the first direction;
   generating a fourth line profile from the object edge imaged on a second pixel subset in each of the second plurality of mutually collinear symmetric multi-pixel phase-difference detectors; and
   determining a second phase shift from a spatial separation between the first line profile and the second line profile.

15. The method of claim 10, further comprising imaging the object edge onto the image sensor with an imaging objective.

16. The method of claim 15, further comprising reducing the first phase shift by changing a distance between the imaging objective and the image sensor.

* * * * *